United States Patent
Seo et al.

(10) Patent No.: US 9,693,340 B2
(45) Date of Patent: Jun. 27, 2017

(54) METHOD AND APPARATUS FOR TRANSMITTING UPLINK CONTROL INFORMATION IN WIRELESS COMMUNICATION SYSTEM

(71) Applicant: LG ELECTRONICS INC., Seoul (KR)

(72) Inventors: Dongyoun Seo, Anyang-si (KR); Joonkui Ahn, Anyang-si (KR); Suckchel Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 219 days.

(21) Appl. No.: 14/375,965

(22) PCT Filed: Feb. 4, 2013

(86) PCT No.: PCT/KR2013/000888
§ 371 (c)(1),
(2) Date: Jul. 31, 2014

(87) PCT Pub. No.: WO2013/115623
PCT Pub. Date: Aug. 8, 2013

(65) Prior Publication Data
US 2015/0009926 A1 Jan. 8, 2015

Related U.S. Application Data

(60) Provisional application No. 61/594,389, filed on Feb. 3, 2012, provisional application No. 61/611,561, filed on
(Continued)

(51) Int. Cl.
*H04L 1/00* (2006.01)
*H04L 5/00* (2006.01)
*H04W 72/04* (2009.01)

(52) U.S. Cl.
CPC ....... *H04W 72/0413* (2013.01); *H04L 1/0027* (2013.01); *H04L 5/0055* (2013.01); *H04L 1/0026* (2013.01)

(58) Field of Classification Search
CPC ... H04L 5/0037; H04L 5/0055; H04L 1/0041; H04L 1/1692; H04L 5/001; H04L 1/0071;
(Continued)

(56) References Cited

U.S. PATENT DOCUMENTS

2011/0274043 A1* 11/2011 Nam ................ H04L 5/001
370/328
2012/0113832 A1* 5/2012 Montojo ............... H04L 1/0026
370/252
(Continued)

FOREIGN PATENT DOCUMENTS

KR  10-2009-0094743  9/2009
KR  10-2011-0046288  5/2011
(Continued)

*Primary Examiner* — Redentor Pasia
*Assistant Examiner* — Peter Mak
(74) *Attorney, Agent, or Firm* — Dentons US LLP

(57) ABSTRACT

Provided are a method for transmitting uplink control information by a user equipment in a wireless communication system and a user equipment using the method. The method comprises the steps of: setting subframes for transmitting periodic channel state information (CSI); and transmitting the periodic CSI from the subframes, wherein a first resource or a second resource is used depending on a combination of acknowledgement/negative-acknowledgement (ACK/NACK) which can be transmitted from the subframes.

10 Claims, 25 Drawing Sheets

Related U.S. Application Data on Mar. 15, 2012, provisional application No. 61/615,848, filed on Mar. 26, 2012, provisional application No. 61/645,059, filed on May 10, 2012, provisional application No. 61/650,990, filed on May 23, 2012, provisional application No. 61/678,618, filed on Aug. 1, 2012.

(58) Field of Classification Search
CPC ... H04L 1/1685; H04L 1/0057; H04L 1/1671; H04L 1/0026; H04L 1/0072; H04L 1/007; H04L 5/0057; H04W 72/0413
See application file for complete search history.

(56) References Cited

U.S. PATENT DOCUMENTS

| | | | | |
|---|---|---|---|---|
| 2012/0113962 A1* | 5/2012 | Jen | ............................ | H04L 1/16 370/336 |
| 2013/0016707 A1* | 1/2013 | He | ........................ | H04L 1/0031 370/336 |
| 2013/0083741 A1* | 4/2013 | Larsson | ................ | H04L 5/0094 370/329 |
| 2013/0117622 A1* | 5/2013 | Blankenship | ....... | H03M 13/136 714/751 |

FOREIGN PATENT DOCUMENTS

| | | |
|---|---|---|
| KR | 10-2011-0074499 | 6/2011 |
| WO | 2011-041445 | 4/2011 |
| WO | 2011-140509 | 11/2011 |

* cited by examiner

UCI OF FIRST RESOURCE        UCI OF SECOND RESOURCE

EVEN WHEN DL CHANNEL
REQUIRING A/N RESPONSE
CANNOT BE DETECTED,
A/N BIT FIELD IS HELD

UCI OF FIRST RESOURCE       UCI OF SECOND RESOURCE

EVEN WHEN DL CHANNEL
REQUIRING A/N RESPONSE CANNOT
BE DETECTED, A/N BIT FIELD IS HELD

METHOD AND APPARATUS FOR TRANSMITTING UPLINK CONTROL INFORMATION IN WIRELESS COMMUNICATION SYSTEM

This application is a 35 USC §371 National Stage entry of International Application No. PCT/KR2013/000888 filed on Feb. 4, 2013, and claims priority to US Provisional Application Nos. 61/594,389 filed on Feb. 3, 2012, 61/611,561 filed on Mar. 15, 2012, 61/615,848 filed on Mar. 26, 2012, 61/645,059 filed on May 10, 2012, 61/650,990 filed on May 23, 2012, and 61/678,618 filed on Aug. 1, 2012, which are hereby incorporated by reference in their entireties as if fully set forth herein.

BACKGROUND OF THE INVENTION

Field of the Invention

The present invention relates to wireless communication, and more particularly, to a method and an apparatus for transmitting uplink control information in a wireless communication system.

Related Art

In a wideband wireless communication system, effective transmission and reception techniques and utilization measures have been proposed in order to maximize efficiency of limited radio resources. One of systems considered as a next-generation wireless communication system is an orthogonal frequency division multiplexing (OFDM) system that can attenuate an inter-symbol interference (ISI) effect with low complexity. In the OFDM, a data symbol input in series is converted into N parallel data symbols which are loaded on N separated subcarriers to be transmitted, respectively. The subcarriers maintain orthogonality in respect of a frequency. Respective orthogonal channels undergo independent frequency selective fading, and as a result, complexity in a receiver is decreased and an interval of transmitted symbols is increased to minimize inter-symbol interference.

Orthogonal frequency division multiple access (hereinafter, referred to as OFDMA) represents a multiple access method that implements a multiple access by independently some of usable subcarriers to each user in a system using the OFDM as a modulation scheme. The OFDMA provides frequency resources such as the subcarriers to each user and the respective frequency resources are independently provided to a plurality of users not to be overlapped with each other, in general. Consequently, the frequency resources are exclusively allocated for each user. In the OFDMA system, frequency diversity for multiple users may be acquired through frequency selective scheduling and the subcarriers may be allocated in various patterns according to a permutation scheme for the subcarriers. In addition, efficiency of a spatial area may be increased by a space multiplexing technique using multiple antennas.

Multiple-input multiple-output (MIMO) technology improves transmission and reception efficiency of data by using multiple transmitting antennas and multiple receiving antennas. A technique for implementing diversity in an MIMO system includes a space frequency block code (SFBC), a space time block code (STBC), cyclic delay diversity (CDD), frequency switched transmit diversity (FSTD), time switched transmit diversity (TSTD), precoding vector switching (PVS), spatial multiplexing (SM), and the like. An MIMO channel matrix depending on the number of receiving antennas and the number of transmitting antennas may be dissolved into a plurality of independent channels. The respective independent channels are called layers or streams. The number of layers represents a rank.

Uplink control information (UCI) may be transmitted through a physical uplink control channel (PUCCH). The uplink control information may include various types of information including a scheduling request (SR), an acknowledgement/non-acknowledgement (ACK/NACK) signal, a channel quality indicator (CQI), a precoding matrix indicator (PMI), a rank indicator (RI), and the like. The PUCCH transports various types of control information according to a format.

In recent years, a carrier aggregation system attracts attention. The carrier aggregation system means a system that configures the wide band by collecting one or more subcarriers having a smaller bandwidth than a target wide band when the wireless communication system supports the wide band.

In the carrier aggregation system, a method for efficiently and reliably transmitting various types of uplink control information is required.

SUMMARY OF THE INVENTION

The present invention provides a method and an apparatus for transmitting uplink control information in a wireless communication system.

In one aspect, a method for transmitting uplink control information performed by a user equipment in a wireless communication system includes: configuring a subframe transmitting periodic channel state information (CSI); and using a first source or a second source according to an ACK/NACK (acknowledgement/not-acknowledgement) combination to be transmitted in the subframe, when the periodic CSI is transmitted in the subframe.

In another aspect, an apparatus includes: a radio frequency (RF) unit transmitting or receiving a radio signal; and a processor connected with the RF unit, in which the processor configures a subframe transmitting periodic channel state information CSI, and uses a first source or a second source according to an ACK/NACK (acknowledgement/not-acknowledgement) combination to be transmitted in the subframe, when the periodic CSI is transmitted in the subframe.

When different types of uplink control information (UCI) need to be transmitted in the same subframe, the uplink control information may be efficiently multiplexed and transmitted. Particularly, even in the case where an error occurs with respect to the generation of the ACK/NACK between the base station and the user equipment, it is possible to minimize an effect on other UCIs.

DESCRIPTION OF EXEMPLARY EMBODIMENTS

Figure 1:
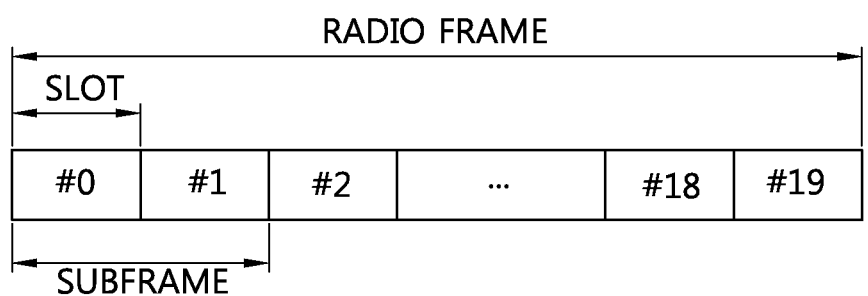
FIG. 1 illustrates a structure of a radio frame in 3GPP LTE.

Technology described below may be used in various wireless communication systems including code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. IEEE 802.16m as the evolution of IEEE 802.16e provides backward compatibility with a system based on the IEEE 802.16e. The UTRA is a part of a universal mobile telecommunication system (UMTS). $3^{rd}$ generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE. The LTE/LTE-A is primarily described for clear description, but the spirit of the present invention is not limited thereto.

The wireless communication system includes at least one base station (BS). Each base station provides a communication service to a specific geographical region. User equipment (UE) may be fixed or movable and may be called other terms such as a mobile station (MS), a mobile terminal (MT), a user terminal (UT), a subscriber station (SS), a wireless device, a personal digital assistant (PDA), a wireless modem, a handheld device, and the like. The base station generally represents a fixed station that communicates with the user equipment, and may be called different terms such as an evolved-NodeB (eNB), a base transceiver system (BTS), an access point, and the like.

The user equipment generally belongs to one cell and the cell to which the user equipment belongs is referred to as a serving cell. A base station that provides the communication service to the serving cell is referred to as a serving base station (BS). The serving BS may provide one or a plurality of serving cells.

The technology may be used in a downlink or an uplink. In general, the downlink means communication from the base station to the user equipment, and the uplink means communication from the user equipment to the base station.

Layers of a radio interface protocol between the user equipment and the base station may be divided into a first layer L1, a second layer L2, and a third layer L3 based on three lower layers of an open system interconnection (OSI) model which is widely known in a communication system.

A physical layer as the first layer is connected with a medium access control (MAC) layer which is an upper layer through a transport channel, and data moves between the MAC layer and the physical layer through the transport channel. In addition, the data moves between different physical layers, that is, between physical layers at a transmission side and a reception side through a physical channel.

A radio data link layer as the second layer is constituted by the MAC layer, an RLC layer, and a PDCP layer. The MAC layer, as a layer that takes charge of mapping a logic channel and the transport channel, selects an appropriate transport channel in order to transmit data transferred from the RLC layer and adds required control information to a header of an MAC protocol data unit (PDU).

The RLC layer is positioned on an upper layer of the MAC layer to support reliable transmission of the data. Further, the RLC layer segments and concatenates RLC service data units (SDUs) transferred from the upper layer in order to configure data having an appropriate size according to a radio interval. The RLC layer of a receiver supports a reassembling function of the data in order to restore an original RLC SDU from the received RLC PDUs.

The PDCP layer is used only in a packet exchange area, and a header of an IP packet may be compressed and transmitted so as to increase transmission efficiency of packet data in a radio channel.

The RRC layer as the third layer serves to control a lower layer and exchanges radio resource control information between the user equipment and a network. Various RRC statuses including an idle mode an RRC connected mode, and the like are defined according to a communication status of the user equipment, and transition between the RRC statuses is possible if necessary. In the RRC layer, various procedures associated with radio resource management are defined, which include system information broadcasting, an RRC access management procedure, a multiple component carrier configuring procedure, a radio bearer controlling procedure, a security procedure, a measurement procedure, a mobility management procedure (handover), and the like.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream, and the receive antenna means a physical or logical antenna used to receive one signal or stream.

FIG. 1 illustrates a structure of a radio frame in 3GPP LTE.

This may refer to Clause 5 of 3rd Generation Partnership Project (3GPP) TS 36.211 V8.2.0 (2008-03) "Technical Specification Group Radio Access Network; Evolved Universal Terrestrial Radio Access (E-UTRA); Physical channels and modulation (Release 8)". Referring to FIG. 1, the radio frame is constituted by 10 subframes, and one subframe is constituted by two slots. Slots in the radio frame are numbered with slots numbers of #0 to #19. A time required to transmit one subframe is referred to as a transmission time interval (TTI). The TTI may be a scheduling unit for data transmission. For example, the length of one radio subframe may be 10 ms, the length of one subframe may be 1 ms, and the length of one slot may be 0.5 ms.

One slot includes a plurality of orthogonal frequency division multiplexing (OFDM) symbols in a time domain, and a plurality of subcarriers in a frequency domain. Since the 3GPP LTE uses the OFDMA in the downlink, the OFDM symbol is used to express one symbol period and may be called other name according to a multiple access scheme. For example, when an SC-FDMA is used as an uplink multiple access scheme, the OFDM symbol may be called an SC-FDMA symbol. A resource block (RB) includes a plurality of contiguous subcarriers in one slot as a resource allocation unit. The structure of the radio frame is just one example. Accordingly, the number of subframes included in the radio frame, the number of slots included in the subframe, or the number of OFDM symbols included in the slot may be variously changed.

The 3GPP LTE defines that one slot includes 7 OFDM symbols in a normal cyclic prefix (CP), and one slot includes 6 OFDM symbols in an extended CP.

The wireless communication system may be generally divided into a frequency division duplex (FDD) scheme and a time division duplex (TDD) scheme. According to the FDD scheme, uplink transmission and downlink transmission are performed while occupying different frequency bands. According to the TDD scheme, the uplink transmission and the downlink transmission are performed at different timings while occupying the same frequency band. A channel response of the TDD scheme is substantially reciprocal. This means that a downlink channel response and an uplink channel response are almost the same as each other in a given frequency domain. Accordingly, in the wireless communication system based on the TDD, the downlink channel response may be acquired from the uplink channel response. In the TDD scheme, since an entire frequency bands are time-divided into the uplink transmission and the downlink transmission, the downlink transmission by the base station and the uplink transmission by the user equipment may not simultaneously be performed. In the TDD system in which the uplink transmission and the downlink transmission are divided by the unit of the subframe, the uplink transmission and the downlink transmission are performed in different subframes. In the TDD scheme, the uplink subframe and the downlink subframe coexist in one frame, and the configuration is determined by an uplink-downlink configuration. The UL-DL configuration may refer to Table 4.2.2 of 3GPP TS 36.211 V10.0.0.

Figure 2:
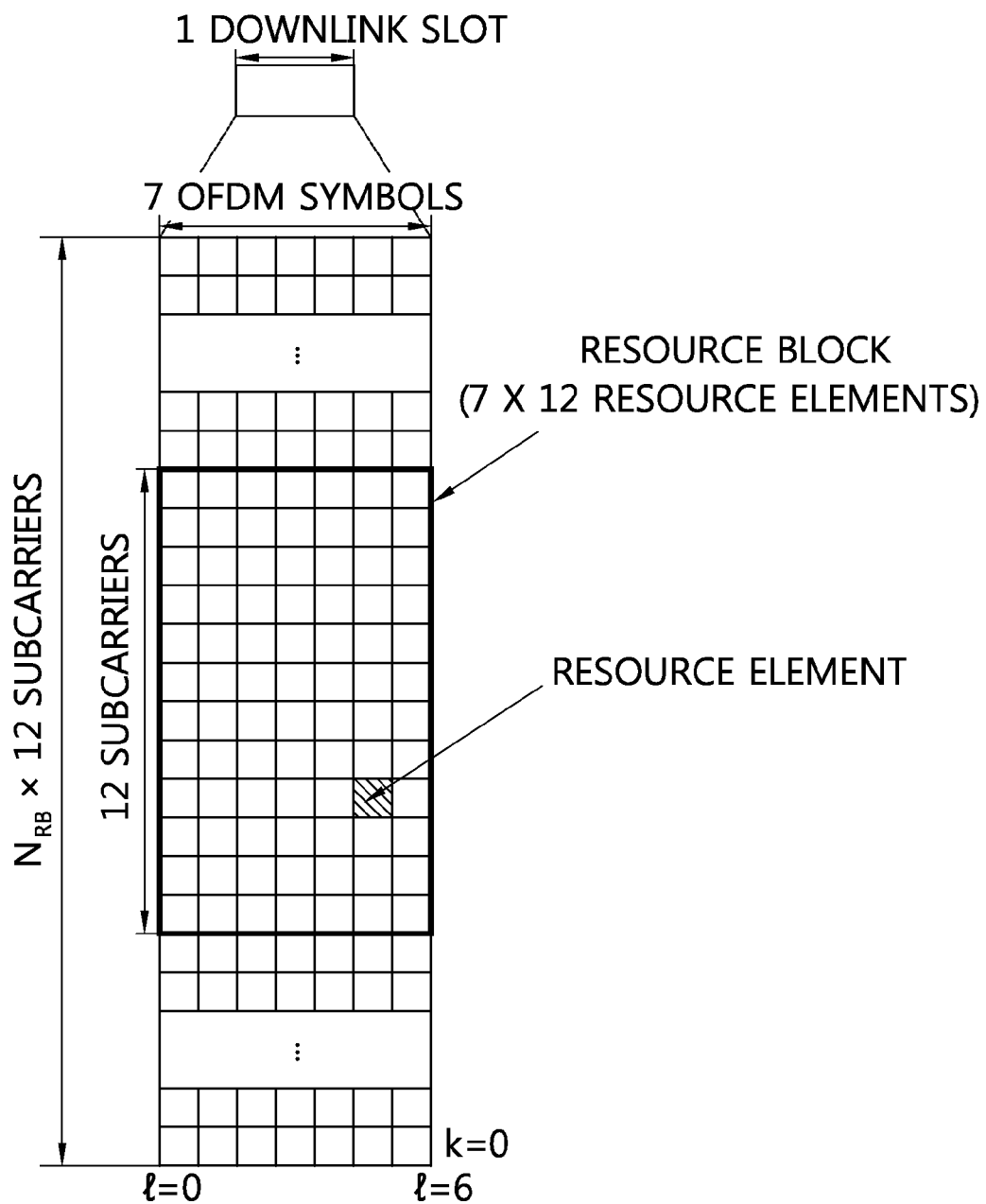
FIG. 2 illustrates one example of a resource grid for one downlink slot.

FIG. 2 illustrates one example of a resource grid for one downlink slot.

The downlink slot includes a plurality of OFDM symbols in the time domain, and includes $N_{RB}$ resource blocks in the frequency domain. The number $N_{RB}$ of resource blocks included in the downlink slot is subordinate to a downlink bandwidth $N^{DL}$ set in a cell. For example, in an LTE system, $N_{RB}$ may be any one of 6 to 110. One resource block includes a plurality of subcarriers in the frequency domain. A structure of an uplink slot may also be the same as that of the downlink slot.

Each element on the resource grid is called a resource element (RE). The resource element on the resource grid may be identified by a pair of indexes (k,l) in the slot. Herein, k (k=0, . . . , $N_{RB}$×12-1) represents a subcarrier index in the frequency domain, and l (l=0, . . . , 6) represents an OFDM symbol index in the time domain.

Herein, it is exemplified that one resource block is 7×12 resource elements which are constituted by 7 OFDM symbols in the time domain and 12 subcarriers in the frequency domain, but the number of the OFDM symbols and the number of the subcarriers in the resource block are not limited thereto. The number of the OFDM symbols and the number of the subcarriers may be variously changed depending on the length of the CP, frequency spacing, and the like. For example, in the case of a normal cyclic prefix (CP), the number of OFDM symbols is 7, and in the case of an extended cyclic prefix (CP), the number of OFDM symbols is 6. As the number of subcarriers in one OFDM symbol, one of 128, 256, 512, 1024, 1536, and 2048 may be selected and used.

Figure 3:
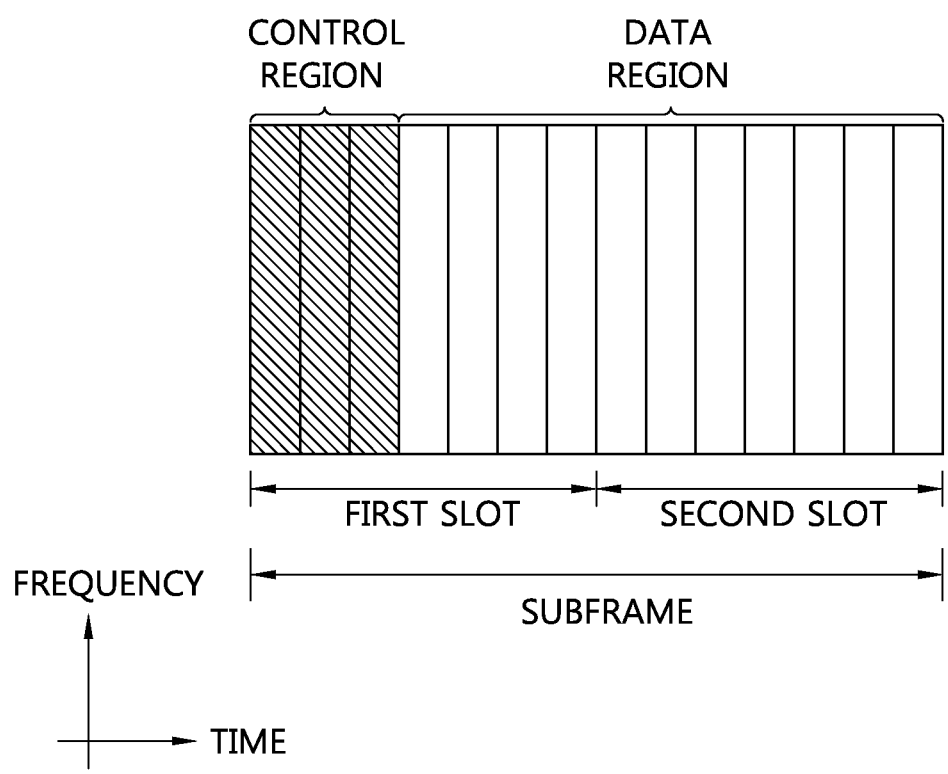
FIG. 3 illustrates a structure of a downlink subframe.

FIG. 3 illustrates a structure of a downlink subframe.

The downlink subframe includes two slots in the time domain, and each slot includes seven OFDM symbols in the normal CP. Preceding maximum 3 OFDM symbols (maximum 4 OFDM symbols for a 1.4 Mhz bandwidth) of a first slot in the subframe are a control region to which control channels are allocated, and residual OFDM symbols become a data region to which a physical downlink shared channel (PDSCH) is allocated.

A PUCCH may carry resource allocation and a transmission format of a downlink-shared channel (DL-SCH), resource allocation information of an uplink shared channel (UL-SCH), paging information on a PCH, system information on the DL-SCH, resource allocation of an upper layer control message such as a random access response transmitted on the PDSCH, a set of transmission power control commands for individual UEs in a predetermined UE group, and activation of voice over Internet protocol (VoIP). A plurality of PDCCHs may be transmitted in the control region, and the user equipment may monitor the plurality of PDCCHs. The PDCCH is transmitted on aggregation of one or several contiguous control channel elements (CCEs). The CCE is a logical allocation unit used to provide to the coding rate to the PDCCH depending on a state of a radio channel. The CCEs correspond to a plurality of resource element groups. A format of the PDCCH and the bit number of an available PDCCH are determined according to a correlation of the number of CCEs and the coding rate provided by the CCEs.

The base station determines a PDCCH format according to downlink control information (DCI) to be transmitted to the user equipment, and adds a cyclic redundancy check (CRC) to the control information. A unique identifier (radio network temporary identifier (RNTI)) is masked on the CRC according to an owner or a purpose of the PDCCH. In the case of a PDCCH for specific user equipment, a unique identifier of the user equipment, for example, a cell-RNTI (C-RNTI) may be masked on the CRC. Alternatively, in the case of a PDCCH for a paging message, a paging indication identifier, for example, a paging-RNTI (P-RNTI) may be masked on the CRC. In the case of a PDCCH for a system information block (SIB), a system information (SI)-RNTI may be masked on the CRC. A random access (RA)-RNTI may be masked on the CRC in order to indicate the random access response which is a response to transmission of a random access preamble of the user equipment.

Figure 4:
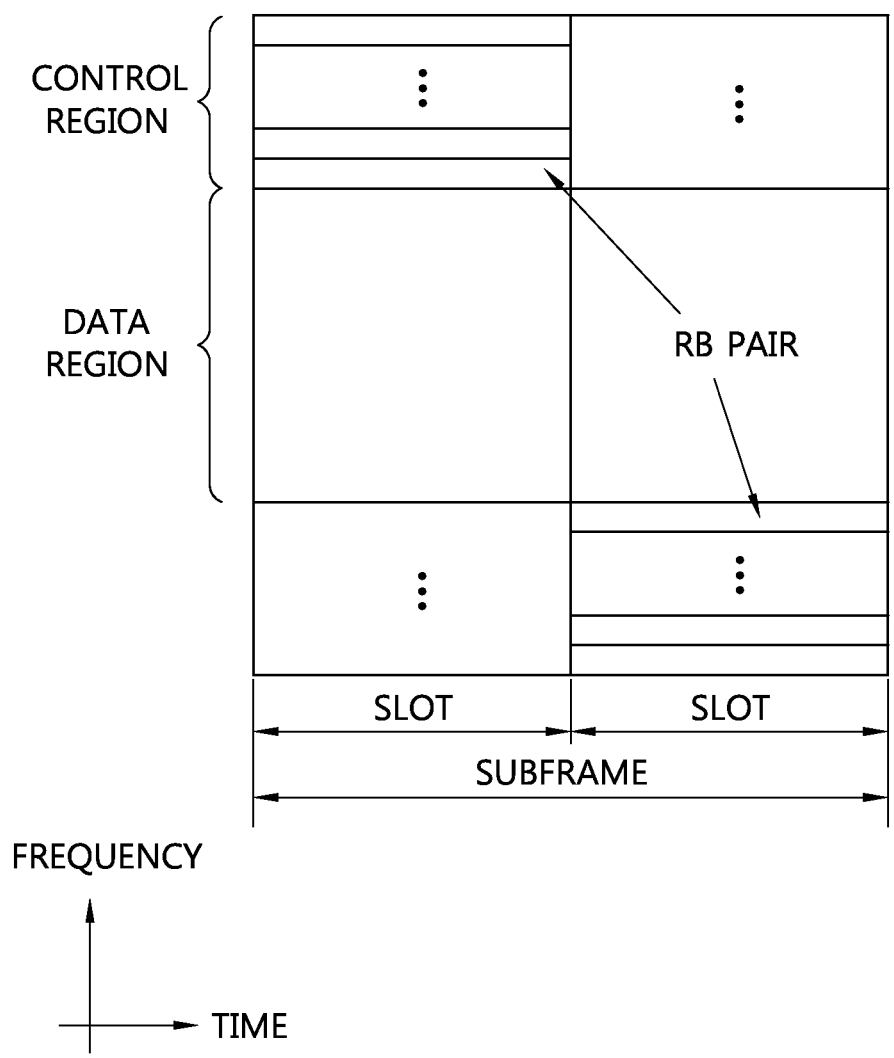
FIG. 4 illustrates a structure of an uplink subframe.

FIG. 4 illustrates a structure of an uplink subframe.

The uplink subframe may be divided into a control region and a data region in the frequency domain. A physical uplink control channel (PUCCH) for transmitting the uplink control information is allocated to the control region. A physical uplink shared channel (PUSCH) for transmitting data is allocated to the data region.

When indicated in an upper layer, the user equipment may support simultaneous transmission of the PUSCH and the PUCCH.

A PUCCH for one user equipment is allocated to a resource block (RB) pair in the subframe. Resource blocks that belong to the RB pair occupy different subcarriers in first and second slots, respectively. A frequency occupied by the resource blocks that belongs to the RB pair allocated to the PUCCH is changed based on a slot boundary. This means that the RB pair allocated to the PUCCH is frequency-hopped on the slot boundary. The user equipment transmits the uplink control information through different subcarriers with time to acquire a frequency diversity gain.

The PUSCH is mapped in the uplink shared channel (UL-SCH) which is a transport channel. Uplink data transmitted on the PUSCH may be a transport block which is a data block for the UL-SCH transmitted during the TTI. The transport block may be user information. Alternatively, the uplink data may be multiplexed data. The multiplexed data may be acquired by multiplexing the transport block for the UL-SCH and the uplink control information (UCI). For example, the uplink control information multiplexed in the data may include a channel quality indicator (CQI), a precoding matrix indicator (PMI), a hybrid automatic repeat request acknowledgement/not-acknowledgement (HARQ-ACK/NACK) (represented as HARQ-ACK or simply represented by A/N), a rank indicator (RI), and the like. Alternatively, the uplink data may be constituted by only the uplink control information.

Meanwhile, the wireless communication system may support carrier aggregation (CA). Herein, the carrier aggregation means collecting a plurality of carriers having a small bandwidth to configure a wide band. The carrier aggregation system means a system that configures the wide band by collecting one or more subcarriers having a smaller bandwidth than a target wide band when the wireless communication system supports the wide band.

Figure 5:
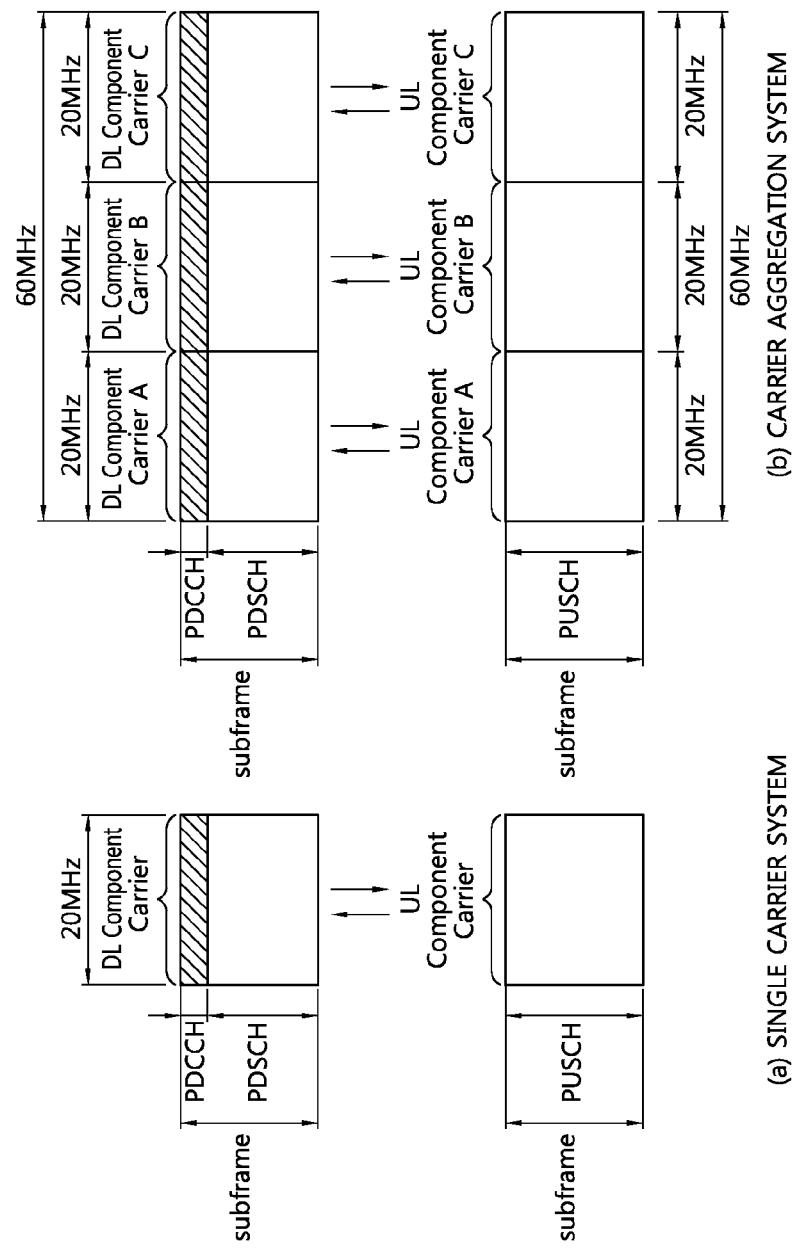
FIG. 5 illustrates a comparative example of a single carrier system and a carrier aggregation system.

FIG. 5 illustrates a comparative example of a single carrier system and a carrier aggregation system.

Referring to FIG. 5, in the single carrier system, only one carrier may be supported to the user equipment through the uplink and the downlink. A bandwidth of the carrier may be diversified, but one carrier is allocated to the user equipment. On the contrary, in the carrier aggregation system, a plurality of component carriers (CCs) may be allocated to the user equipment. CC). For example, three 20 MHz component carriers may be allocated so as to allocate a bandwidth of 60 MHz to the user equipment. The component carriers include downlink CCs (DL CCs) and uplink CCs (UL CCs).

The carrier aggregation system may be divided into a contiguous carrier aggregation system in which respective carriers are contiguous and a non-contiguous carrier aggregation system in which the respective carriers are separated from each other. When hereinafter, simply referred to as the carrier aggregation system, it should be understood that the carrier aggregation system includes both the system in which the component carriers are contiguous and the system in which the component carriers are not contiguous.

Component carriers to be targeted when one or more component carriers are collected may just use a bandwidth used in the existing system for backward compatibility with the existing system. For example, a 3GPP LTE system supports bandwidths of 1.4 MHz, 3 MHz, 5 MHz, 10 MHz, 15 MHz, and 20 MHz, and a 3GPP LTE-A system may configure a wide band of 20 MHz or more by using only the bandwidths of the 3GPP LTE system. Alternatively, the wideband may be configured by defining a new bandwidth without using the bandwidth of the existing system as it is.

A system frequency band of the wireless communication system is divided into a plurality of carrier frequencies. Herein, the carrier frequency means a center frequency of a cell. Hereinafter, the cell may mean a downlink frequency resource and an uplink frequency resource. Alternatively, the cell may mean a combination of the downlink frequency resource and an optional uplink frequency resource. Further, in general, when the carrier aggregation (CA) is not considered, the uplink and downlink frequency resources may continuously exist as a pair in one cell.

In order to transmit and receive packet data through a specific cell, the user equipment should first complete a configuration for the specific cell. Herein, the configuration means a state in which system information required to transmit and receive the data to the corresponding cell is received is completed. For example, the configuration may include a whole process of receiving common physical layer parameters required to transmit and receive the data, MAC layer parameters, or parameters required for a specific operation in an RRC layer. When a cell of which the configuration is completed receives only information to transmit the packet data, the cell is in a state in which a packet can be immediately transmitted and received.

The cell of which the configuration is completed may exist in an activation state or a deactivation state. Herein, the activation represents that data is transmitted or received or in a ready state. The user equipment may monitor or receive the control channel (PDCCH) and the data channel (PDSCH) of the activated cell in order to verify resources (may be the frequency, the time, and the like) allocated thereto.

The deactivation represents that traffic data cannot be transmitted or received, or measurement or minimum information can be transmitted/received. The user equipment may receive system information (SI) required to receive the packet from the deactivated cell. On the contrary, the user equipment does not monitor or receive the control channel (PDCCH) and the data channel (PDSCH) of the deactivated cell in order to verify the resources (may be the frequency, the time, and the like) allocated thereto.

The cells may be divided into a primary cell (PCell), a secondary cell (SCell), and a serving cell.

The primary cell means a cell that operates at a primary frequency, and means a cell in which the user equipment performs an initial connection establishment procedure or a connection reestablishment procedure with the base station, or a cell indicated the primary cell during a handover procedure.

The secondary cell means a cell that operates at a secondary frequency, and once RRC establishment is settled, the secondary cell is configured and is used to provide an additional radio resource.

The serving cell is configured as the primary cell in the case of a user equipment in which the CA is not configured or the CA cannot be provided. When the CA is configured, a term called the serving cell is used to represent a set constituted by the primary cell and one or a plurality of cells of all secondary cells.

That is, the primary cell represents one serving cell that provides a security input and NAS mobility information in an RRC establishment or re-establishment state. According to capabilities of the user equipment, at least one cell may be configured to form a set of serving cells together with the primary cell, and the at least one cell is referred to as the secondary cell.

Accordingly, the serving cell configured for one user equipment may be constituted by only one primary cell or by one primary cell and at least one secondary cell, and a plurality of serving cells may be configured for the user equipment.

A primary component carrier (PCC) means a CC corresponding to the primary cell. The PCC is a CC in which the user equipment is initially connected or RRC-connected with the base station among several CCs. The PCC is a special CC that takes charge of connection or RRC connection for signaling regarding a plurality of CCs and manages UE context information which is establishment information associated with the user equipment. Further, when the PCC is connected with the user equipment and the PCC is in an RRC connected mode, the PCC continuously exists in the activation state.

A second component carrier (SCC) means a CC corresponding to the secondary cell. That is, the SCC is a CC allocated to the user equipment except for the PCC, and the SCC is an extended carrier for additional resource allocation, or the like and the SCC may be in the activated state or the deactivated state.

A downlink component carrier corresponding to the primary cell is referred to as a downlink primary component carrier (DL PCC), and an uplink component carrier corresponding to the primary cell is referred to as an uplink primary component carrier (UL PCC). Further, in the downlink, a component carrier corresponding to the secondary cell is referred to as a DL secondary CC (DL SCC), and in the uplink, a component carrier corresponding to the secondary cell is referred to as an uplink secondary component carrier (UL SCC).

The primary cell and the secondary cell have the following features.

First, the primary cell is used for transmission of the PUCCH.

Second, the primary cell is continuously activated, while the secondary cell is a carrier activated/deactivated according to a specific condition.

Third, when the primary cell undergoes a radio link failure (hereinafter, referred to as an RLF), the RRC re-establishment is triggered, but when the secondary cell undergoes the RLF, the RRC re-establishment is not triggered.

Fourth, the primary cell may be changed by changing a security key or a handover procedure accompanied with a random access channel (RACH) procedure.

Fifth, non-access stratum (NAS) information is received through the primary cell.

Sixth, in the primary cell, the DL PCC and the UL PCC are continuously constituted as a pair.

Seventh, different component carriers CCs may be configured as the primary cells in respective user equipments.

Eighth, procedures of reconfiguration, adding, and removal of the primary cell may be performed by the RRC layer. In the addition of a new secondary cell, RRC signaling may be used to transmit system information of a dedicated secondary cell.

The downlink component carrier may constitute one serving cell, and the downlink component carrier and the uplink component carrier are established to constitute one serving cell. However, the serving cell is not constituted by only one uplink component carrier.

Activation/deactivation of the component carrier is equivalent to, that is, a concept of activation/deactivation of the serving cell. For example, assumed that serving cell 1 is constituted by DL CC1, activation of serving cell 1 means activation of DL CC1. Assumed that serving cell 2 is constituted by establishing DL CC2 and UL CC2, activation of serving cell 2 means activation of DL CC2 and UL CC2. In the meantime, each component carrier may correspond to the cell.

The numbers of component carriers aggregated between the downlink and the uplink may be set to be different from each other. A case in which the number of the downlink CCs and the number of uplink CCs are the same as each other is referred to as symmetric aggregation, and a case in which the numbers are different from each other is referred to as asymmetric aggregation. Further, the sizes (that is, bandwidths) of the CCs may be different from each other. For example, when it is assumed that five CCs are used to configure a 70 MHz-band, the 70 MHz-band may be constituted by a 5 MHz CC (carrier #0), a 20 MHz CC (carrier #1), a 20 MHz CC (carrier #2), a 20 MHz CC (carrier #3), and a 5 MHz CC (carrier #4).

As described above, the carrier aggregation system may support a plurality of component carriers (CCs) unlike the single carrier system. That is, one user equipment may receive a plurality of PDSCHs through a plurality of DL CCs. Further, the user equipment may transmit an ACK/NACK for the plurality of PDSCHs through one UL CC, for example, UL PCC. That is, in the single carrier system in the related art, since only one PDSCH is received in one subframe, maximum two pieces of HARQ ACK/NACK (hereinafter, abbreviated as ACK/NACK for easy description) information were just transmitted. However, in the carrier aggregation system, since the ACK/NACK for the plurality of PDSCHs may be transmitted through one UL CC, an ACK/NACK transmitting method therefor is required.

The user equipment may monitor the PDCCH in the plurality of DL CCs and receive a downlink transport block simultaneously through the plurality of DL CCs. The user equipment may transmit a plurality of uplink transport blocks simultaneously through a plurality of UL CCs.

In the multiple carrier system, two methods for CC scheduling can be provided.

The first method is that a PDCCH-PDSCH pair is transmitted from one CC. The CC is referred to as self-scheduling. Further, this means that the UL CC through which the PUSCH is transmitted means becomes a CC linked to the DL CC through which the corresponding PDSCCH is transmitted. That is, in the PDCCH, the PDSCH resource is allocated on the same CC, or the PUSCH resource is allocated on the linked UL CC.

The second method is that the DL CC through which the PDSCH is transmitted or the UL CC through which the PUSCH is transmitted is determined regardless of the DL CC through which the PDCCH is transmitted. That is, the PDCCH and the PDSCH are transmitted from different DL CCs, or the PUSCH is transmitted through the UL CC which is not linked with the DL CC through which the PDCCH is transmitted. This is referred to as cross-carrier scheduling. The CC through which the PDCCH is transmitted is referred to as a PDCCH carrier, a monitoring carrier, or a scheduling carrier, or the CC through which the PDSCH/PUSCH is transmitted is referred to as a PDSCH/PUSCH carrier or a scheduled carrier.

Hereinafter, the existing PUCCH formats will be described.

The PUCCH transports various types of control information according to a format. PUCCH format 1 transports a scheduling request (SR). In this case, an on-off keying (OOK) scheme may be applied. PUCCH format 1a transports an acknowledgement/non-acknowledgment (ACK/NACK) modulated by a binary phase shift keying (BPSK) scheme with respect to one codeword. PUCCH format 1b transports an ACK/NACK modulated by a quadrature phase shift keying (QPSK) scheme with respect to two codewords. PUCCH format 2 transports a channel quality indicator (CQI) modulated by the QPSK scheme. PUCCH formats 2a and 2b transport the CQI and the ACK/NACK.

The PUCCH format may be divided according to the modulation scheme and the number of bits in the subframe. Table 1 illustrates a modulation scheme according to the PUCCH format and the number of bits in the subframe.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Figure 6:
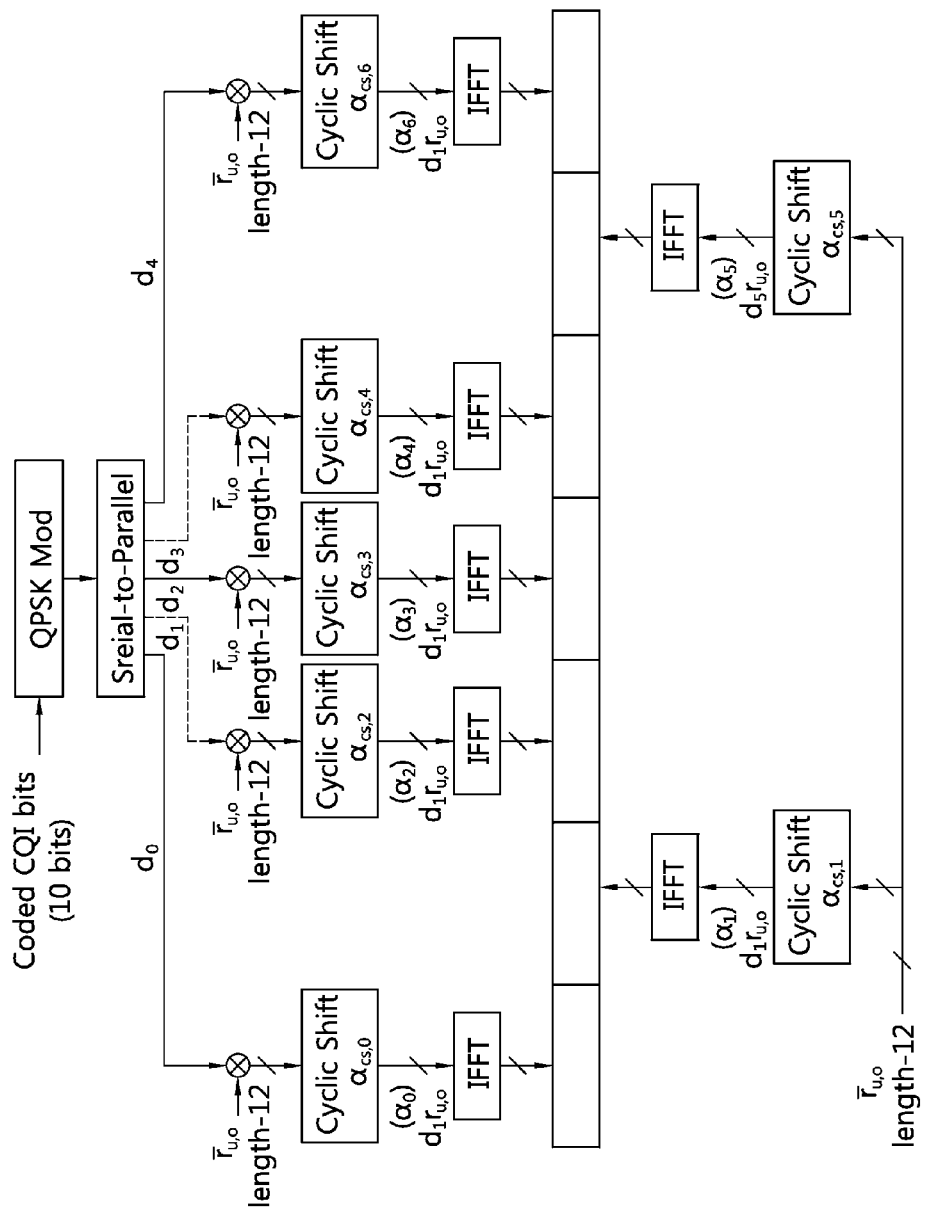
FIG. 6 illustrates a channel structure of a PUCCH format 2/2a/2b for one slot in a normal CP.

FIG. 6 illustrates a channel structure of a PUCCH format 2/2a/2b for one slot in a normal CP. As described above, the PUCCH format 2/2a/2b is used to transmit the CQI.

Referring to FIG. 6, SC-FDMA symbols 1 and 5 are used for a demodulation reference symbol (DM RS) which is an uplink reference signal in the normal CP. In the extended CP, an SC-FDMA symbol 3 is used for the DM RS.

10 CQI information bits are channel-coded at for example, ½ rate to become 20 coded bits. In the channel coding, a reed-muller (RM) code may be used. In addition, the information bits are scrambled (similarly as PUSCH data being scrambled with a gold sequence having a length of 31) and thereafter, mapped with QPSK constellation, and as a result, a QPSK modulation symbol is generated ($d_0$ to $d_4$ in slot 0). Each QPSK modulation symbol is modulated by a cyclic shift of a basic RS sequence having a length of 12 and OFDM-modulated and thereafter, transmitted in each of 10 SC-FDMA symbols in the subframe. 12 periodic shifts uniformly separated allow 12 different user equipments to be orthogonally multiplexed in the same PUCCH resource block. As a DM RS sequence applied to the SC-FDMA symbols 1 and 5, the basic RS sequence having the length of 12 may be used.

Figure 7:
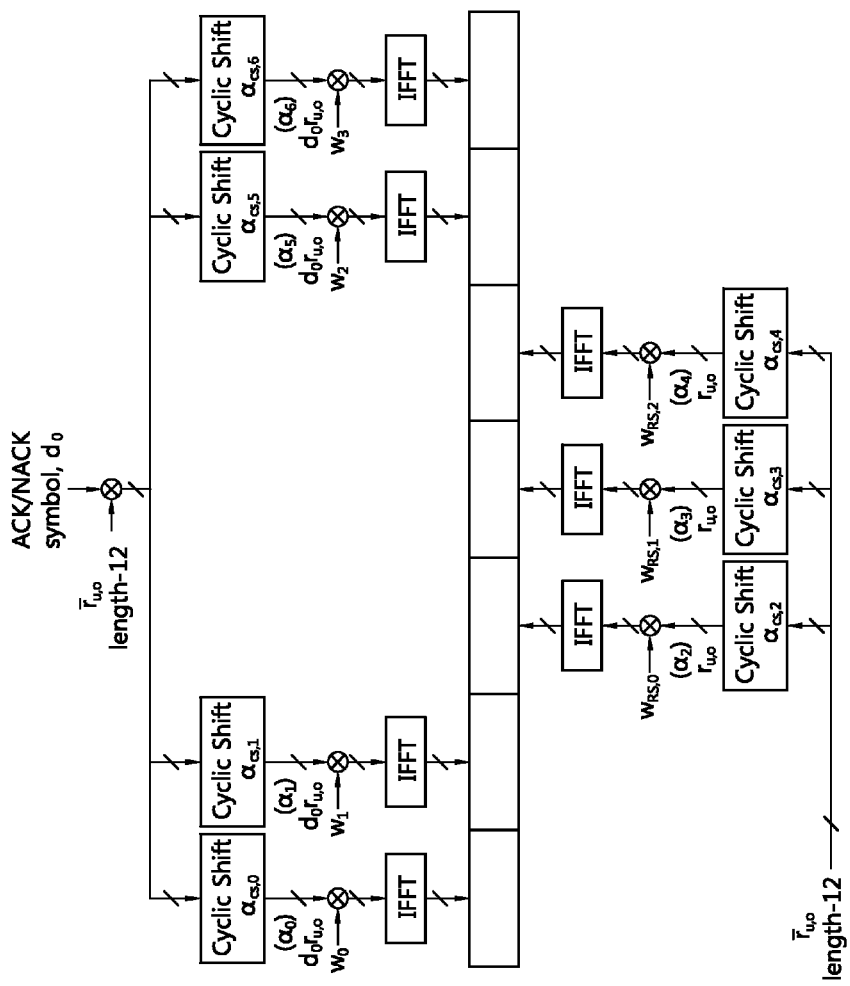
FIG. 7 illustrates a PUCCH format 1a/1b for one slot in the normal CP.

FIG. 7 illustrates a PUCCH format 1a/1b for one slot in the normal CP. The uplink reference signal is transmitted from third to fifth SC-FDMA symbols. In FIG. 7, $w_0, w_1, w_2$, and $w_3$ may be modulated in the time domain after inverse fast Fourier transform (IFFT) modulation or modulated in the frequency domain before the IFFT modulation.

In the LTE, the ACK/NACK and the CQI may be simultaneously transmitted in the same subframe and may not be permitted to be simultaneously transmitted. At the time, the ACK/NACK is an ACK/NACK for a single cell. When the ACK/NACK and the CQI are not permitted to be simultaneously transmitted, the user equipment may need to transmit the ACK/NACK in a PUCCH of a subframe in which CQI feedback is configured. In this case, the CQI is dropped, and only the ACK/NACK is transmitted through the PUCCH format 1a/1b.

The simultaneous transmission of the ACK/NACK and the CQI in the same subframe may be configured through user equipment-specific upper layer (RRC) signaling. For example, whether the ACK/NACK and the CQI may be simultaneously transmitted in the same subframe may be configured by a parameter of 'simultaneousAckNackAnd-CQI' included in the radio resource control (RRC) message. That is, when 'simultaneousAckNackAndCQI' is set as 'TRUE', the simultaneous transmission may be permitted, and when 'simultaneousAckNackAndCQI' is set as 'FALSE', the simultaneous transmission may not be permitted. When the simultaneous transmission is possible, the CQI and 1-bit or 2-bit ACK/NACK information may be multiplexed in the same PUCCH resource block in a subframe in which a base station scheduler permits the simultaneous transmission of the CQI and the ACK/NACK. In this case, it is necessary to maintain a single carrier characteristic having low cubic metric (CM). The normal CP and the extended CP are different from each other in a method for multiplexing the CQI and the ACK/NACK while maintaining the single carrier characteristic.

First, when the 1-bit or 2-bit ACK/NACK and the CQI are together transmitted through the PUCCH format 2a/2b in the normal CP, ACK/NACK bits are not scrambled, but BPSK (in the case of 1 bit)/QPSK (in the case of 2 bits)-modulated to become one ACK/NACK demodulated symbol $d_{HARQ}$. The ACK is encoded by a binary '1' and the NACK is encoded by a binary '0'. One ACK/NACK demodulated symbol $d_{HARQ}$ is used to modulate a second RS symbol in each slot. That is, the ACK/NACK is signaled by using the RS.

Figure 8:
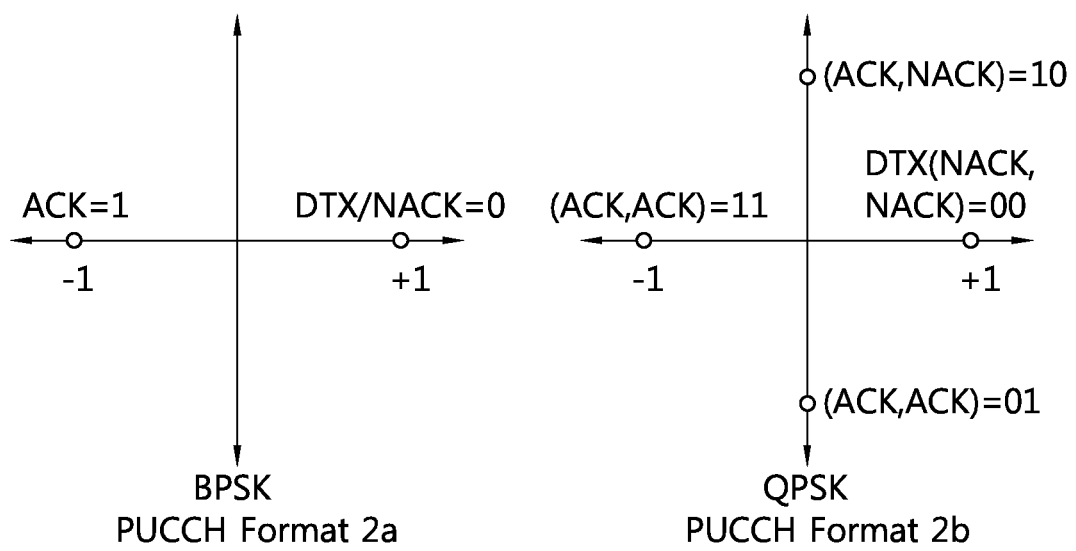
FIG. 8 illustrates an example of constellation mapping of ACK/NACK in the PUCCH format 2a/2ba in the normal CP.

FIG. 8 illustrates an example of constellation mapping of ACK/NACK in the PUCCH format 2a/2ba in the normal CP.

Referring to FIG. 8, the NACK (NACK and NACK in the case of transmitting two downlink codewords) is mapped to +1. In discontinuous transmission (DTX) meaning a case in which the user equipment fails to detect a downlink grant in the PDCCH, neither the ACK nor the NACK is transmitted and in this case, a default NACK is configured. The DTX is analyzed as the NACK by the base station, and causes downlink retransmission.

Next, in the extended CP in which one RS symbol per slot is used, the 1 or 2-bit ACK/NACK is joint-coded with the CQI.

Figure 9:
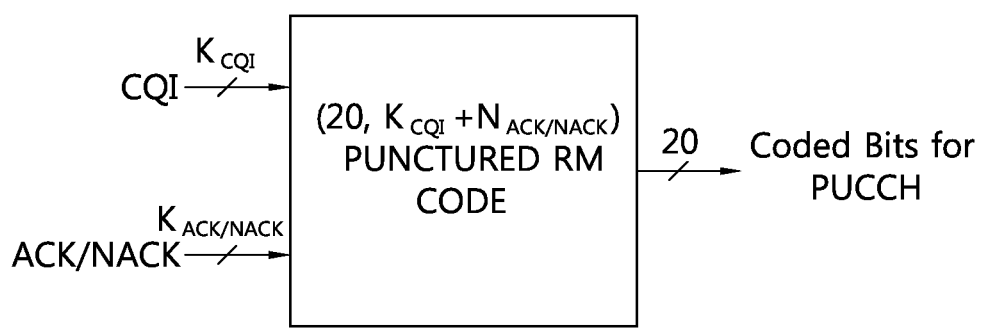
FIG. 9 illustrates an example of joint coding of ACK/NACK and a CQI in an extended CP.

FIG. 9 illustrates an example of joint-coding of ACK/NACK and a CQI in an extended CP.

Referring to FIG. 9, the maximum bit number of information bits supported by an RM code may be 13. In this case, CQI information bits $K_{cqi}$ may be 11 bits, and ACK/NACK information bits $K_{ACK/NACK}$ may be 2 bits. The CQI information bits and the ACK/NACK information bits are concatenated to generate a bit stream and thereafter, channel-coded by the RM code. In this case, it is expressed that the CQI information bits and the ACK/NACK information bits are joint-coded. That is, the CQI information bits and the ACK/NACK information bits are joint-coded to become 20 coded bits. A 20-bit codeword generated through such a process is transmitted in the PUCCH format 2 having the channel structure (different from FIG. 6 in that one RS symbol is used per slot in the case of the extended CP) described in FIG. 6.

In the LTE, the ACK/NACK and the SR are multiplexed to be simultaneously transmitted through the PUCCH format 1a/1b.

Figure 10:
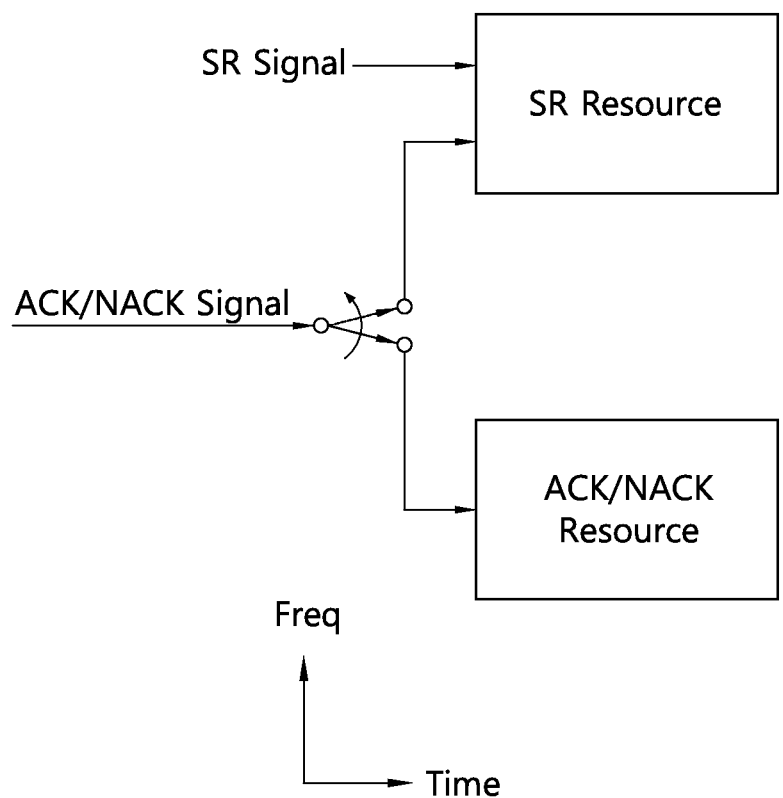
FIG. 10 illustrates a method in which ACK/NACK and an SR are multiplexed.

FIG. 10 illustrates a method in which an ACK/NACK and an SR are multiplexed.

Referring to FIG. 10, when the ACK/NACK and the SR are simultaneously transmitted in the same subframe, the user equipment transmits the ACK/NACK in an allocated SR resource and in this case, the SR means a positive SR. When receiving the positive SR, the base station may know that the user equipment requests scheduling. Further, the user equipment may transmit the ACK/NACK in an allocated ACK/NACK resource, and in this case, the SR means a negative SR. That is, the base station may identify whether the SR is the positive SR or the negative SR as well as the ACK/NACK through which resource the ACK/NACK being transmitted in the subframe in which the ACK/NACK and the SR are simultaneously transmitted.

Figure 11:
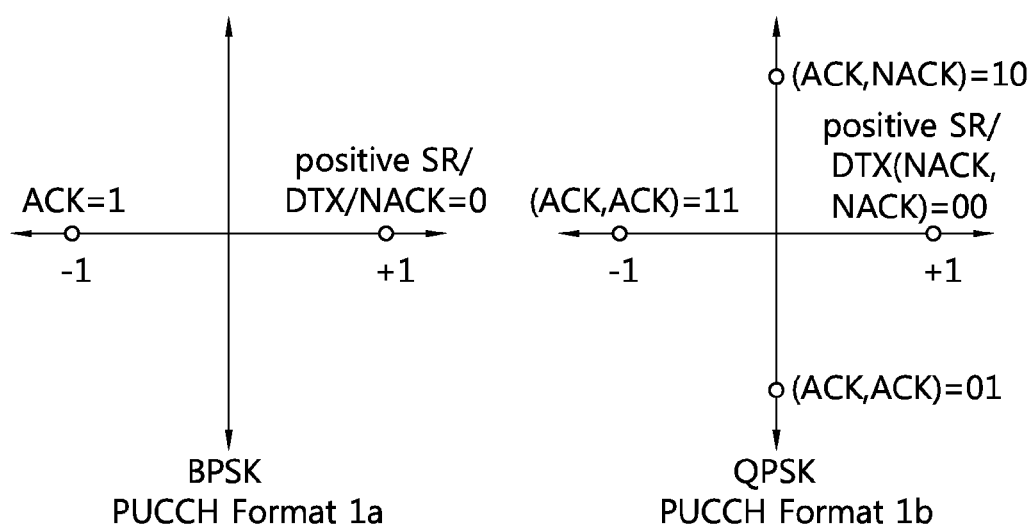
FIG. 11 illustrates constellation mapping when the ACK/NACK and the SR are simultaneously transmitted.

FIG. 11 illustrates constellation mapping when the ACK/NACK and the SR are simultaneously transmitted.

Referring to FIG. 11, the DTX/NACK and the positive SR are mapped to +1 of a constellation map, and the ACK is mapped to −1. The constellation map may show a phase of a signal.

Meanwhile, in the LTE TDD system, the user equipment may feed back to the base station a plurality of ACK/NACKs for a plurality of PDSCHs. The reason is that the user equipment may receive the plurality of PDSCHs in a plurality of subframes and transmit the ACK/NACKs for the plurality of PDSCH in one subframe. In this case, two types of ACK/NACK transmitting methods are provided.

The first method is ACK/NACK bundling. In the ACK/NACK bundling, ACK/NACK bits for a plurality of data units are coupled with each other through a logical AND operation. For example, when the user equipment successfully decodes all of the plurality of data units, the user equipment transmits only one ACK bit. On the contrary, when the user equipment fails to decode or detect even any one of the plurality of data units, the user equipment transmits the NACK bit or transmit no NACK bit.

Bundling includes spatial bundling, bundling in the time domain, and bundling in the frequency domain, and the like. The spatial bundling is a technique that compresses an A/N for each codeword at the time of receiving a plurality of codewords in one PDSCH. The bundling in the time domain is a technique that compresses A/Ns for data units received in different subframes. The bundling in the frequency domain is a technique that compresses A/Ns for data units received in different cells (that is, CCs).

The second method is ACK/NACK multiplexing. In the ACK/NACK multiplexing method, contents or meanings of the ACK/NACKs for the plurality of data units may be identified by combinations of PUCCH resources and QPSK modulated symbols used for actual ACK/NACK transmission. This is also called channel selection. The channel selection may be called PUCCH 1a/1b channel selection according to the used PUCCH.

For example, it is assumed that maximum two data units may be transmitted and one PUCCH resource may transport 2 bits. In this case, it is assumed that an HARQ operation for each data unit may be managed by one ACK/NACK bit. In this case, the ACK/NACK may be identified in a transmission node (for example, the base station) that transmits the data unit as shown in a table given below.

TABLE 2

| HARQ-ACK(0), HARQ-ACK(1) | $n^{(1)}_{PUCCH}$ | b(0), b(1) |
|---|---|---|
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

In Table 2, a HARQ-ACK(i) indicates an ACK/NACK result for a data unit i. In the example, two data units of a data unit 0 and a data unit 1 may be provided. In Table 2, the DTX means that the data unit for the corresponding HARQ-ACK(i) is not transmitted. Alternatively, the DTX means that the receiver (for example, the user equipment) does not detect the data unit for the HARQ-ACK(i). $n^{(1)}_{PUCCH,X}$ indicates the PUCCH resource used for the actual transmission of the ACK/NACK, and maximum two PUCCH resources are provided. That is, two PUCCH resources are $n^{(1)}_{PUCCH,X}$ and $n^{(1)}_{PUCCH,1}$. b(0) and b(1) represent 2 bits transferred by a selected PUCCH resource. A modulated symbol transmitted through the PUCCH resource is determined according to b(0) and b(1).

For example, if the receiver successfully receives and decodes two data units, the receiver needs to transmit two bits (b(0), b(1)) as (1,1) by using the PUCCH resource $n^{(1)}_{PUCCH,1}$. As another example, it is assumed that the receiver receives two data units to fail to decode a first data unit and succeed in decoding a second data unit. In this case, the receiver needs to transmit (0, 0) by using $n^{(1)}_{PUCCH,1}$.

As described above, the ACK/NACKs for the plurality of data units may be transmitted by using a single PUCCH resource by a method for linking the content (or meaning) of the ACK/NACK with a combination of a PUCCH resource and a content of an actual bit transmitted in the corresponding PUCCH resource.

In the ACK/NACK multiplexing method, if at least one ACK exists for all data units, the NACK and the DTX is basically displayed as a couple such as the NACK/DTX. The reason is that it is short to cover all ACK/NACK combinations by distinguishing the NACK and the DTX by only a combination of the PUCCH resource and the QPSK symbol.

In the ACK/NACK bundling or the ACK/NACK multiplexing method described above, the total number of PDSCHs as targets of the ACK/NACKs transmitted by the user equipment is important. When the user equipment does not receive some PDCCHs among the plurality of PDCCHs scheduling a plurality of PDSCHs, an error occurs in the total number of the PDSCHs as the targets of the ACK/NACK, and as a result, a wrong ACK/NACK may be transmitted. In order to solve the error, a downlink assignment index (DAI) is included in the PDCCH to be transmitted in the TDD system. The DAI indicates a counting value by counting the number of the PDCCHs scheduling the PDSCH.

Hereinafter, an uplink channel coding method for the PUCCH format 2 will be described.

Table 3 given below shows one example of a (20, A) RM code used for channel coding of the PUCCH format 2. Herein, A may represent the bit number (that is, $K_{cqi}+K_{ACK/NACK}$) of the bit stream in which the CQI information bits and the ACK/NACK information bits are concatenated. When the bit stream is a0, a1, a2, . . . , aA-1, the bit stream may be used as an input of a channel coding block using the (20, A) RM code.

TABLE 3

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0  | 1 | 1 | 0 | 0 | 0 | 0 | 0 | 0 | 0 | 0 | 1 | 1 | 0 |
| 1  | 1 | 1 | 1 | 0 | 0 | 0 | 0 | 0 | 0 | 1 | 1 | 1 | 0 |
| 2  | 1 | 0 | 0 | 1 | 0 | 0 | 1 | 0 | 1 | 1 | 1 | 1 | 1 |
| 3  | 1 | 0 | 1 | 1 | 0 | 0 | 0 | 0 | 1 | 0 | 1 | 1 | 1 |
| 4  | 1 | 1 | 1 | 1 | 0 | 0 | 0 | 1 | 0 | 0 | 1 | 1 | 1 |
| 5  | 1 | 1 | 0 | 0 | 1 | 0 | 1 | 1 | 1 | 0 | 1 | 1 | 1 |
| 6  | 1 | 0 | 1 | 0 | 1 | 0 | 1 | 0 | 1 | 1 | 1 | 1 | 1 |
| 7  | 1 | 0 | 0 | 1 | 1 | 0 | 0 | 1 | 1 | 0 | 1 | 1 | 1 |
| 8  | 1 | 1 | 0 | 1 | 1 | 0 | 0 | 1 | 0 | 1 | 1 | 1 | 1 |
| 9  | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

A bit stream channel-coded by the RM code, $b_0, b_1, b_2, \ldots, b_{B-1}$ may be generated as shown in Equation 1 given below.

$$b_i = \sum_{n=0}^{A-1} (a_n \cdot M_{i,n}) \bmod 2 \qquad \text{[Equation 1]}$$

In Equation 1 given above, I=0, 1, 2, ..., B−1 and B=20.

Channel-coded bits are mapped in the code-time-frequency resource.

Figure 12:
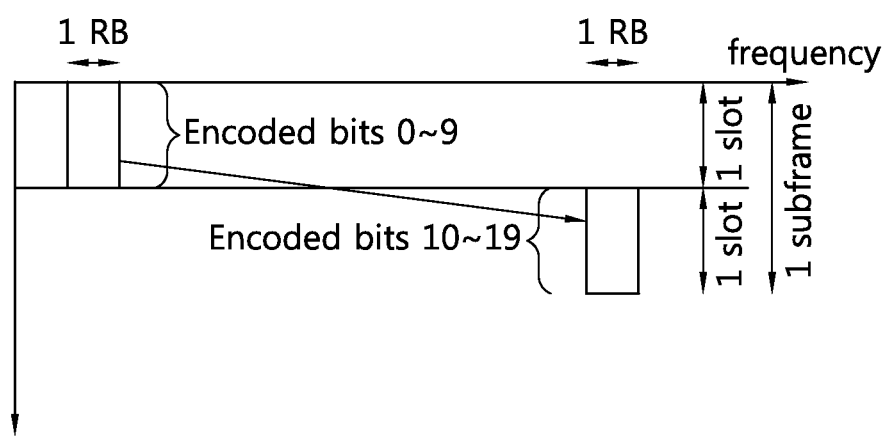
FIG. 12 illustrates an example in which channel-coded bits are mapped to a code-time-frequency resource.

FIG. 12 illustrates an example in which channel-coded bits are mapped to a code-time-frequency resource.

Referring to FIG. 12, the first 10 bits and the last 10 bits among 20 bits which are channel-coded are mapped in different code-time-frequency resources, and in particular, the first 10 bits and the last 10 bits are largely separated and transmitted in the frequency domain for frequency diversity.

Hereinafter, one example of an uplink channel coding method in LTE-A will be described.

As described above, in the LTE, when the UCI is transmitted to the PUCCH format 2, a CSI of maximum 13 bits is RM-coded through the (20, A) RM code of Table 3. On the contrary, when the UCI is transmitted to the PUSCH, a CQI of maximum 11 bits is RM-coded through a (32, A) RM code of Table 4 given below and truncated or circularly repeated in order to match a code rate to be transmitted in the PUSCH.

TABLE 4

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0  | 1 | 1 | 0 | 0 | 0 | 0 | 0 | 0 | 0 | 0 | 1 |
| 1  | 1 | 1 | 1 | 0 | 0 | 0 | 0 | 0 | 0 | 1 | 1 |
| 2  | 1 | 0 | 0 | 1 | 0 | 0 | 1 | 0 | 1 | 1 | 1 |
| 3  | 1 | 0 | 1 | 1 | 0 | 0 | 0 | 0 | 1 | 0 | 1 |
| 4  | 1 | 1 | 1 | 1 | 0 | 0 | 0 | 1 | 0 | 0 | 1 |
| 5  | 1 | 1 | 0 | 0 | 1 | 0 | 1 | 1 | 1 | 0 | 1 |
| 6  | 1 | 0 | 1 | 0 | 1 | 0 | 1 | 0 | 1 | 1 | 1 |
| 7  | 1 | 0 | 0 | 1 | 1 | 0 | 0 | 1 | 1 | 0 | 1 |
| 8  | 1 | 1 | 0 | 1 | 1 | 0 | 0 | 1 | 0 | 1 | 1 |
| 9  | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 0 | 0 | 0 | 1 |
| 26 | 1 | 0 | 1 | 0 | 1 | 0 | 1 | 0 | 1 | 1 | 0 |
| 27 | 1 | 1 | 1 | 1 | 0 | 1 | 0 | 1 | 1 | 1 | 0 |

TABLE 4-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Meanwhile, in the LTE-A, a PUCCH format 3 is introduced in order to transmit a UCI (the ACK/NACK and the SR) of maximum 21 bits (represent the bit number before channel coding as information bits and maximum 22 bits when the SR is included). The PUCCH format 3 uses the QPSK as the modulation method, and a bit number which is transmittable in the subframe is 48 bits (represent a bit number transmitted after the information bits are channel-coded).

The PUCCH format 3 performs block spreading-based transmission. That is, a modulated symbol sequence that modulates a multi-bit ACK/NACK by using a block spreading code is spread and thereafter, transmitted in the time domain.

Figure 13:
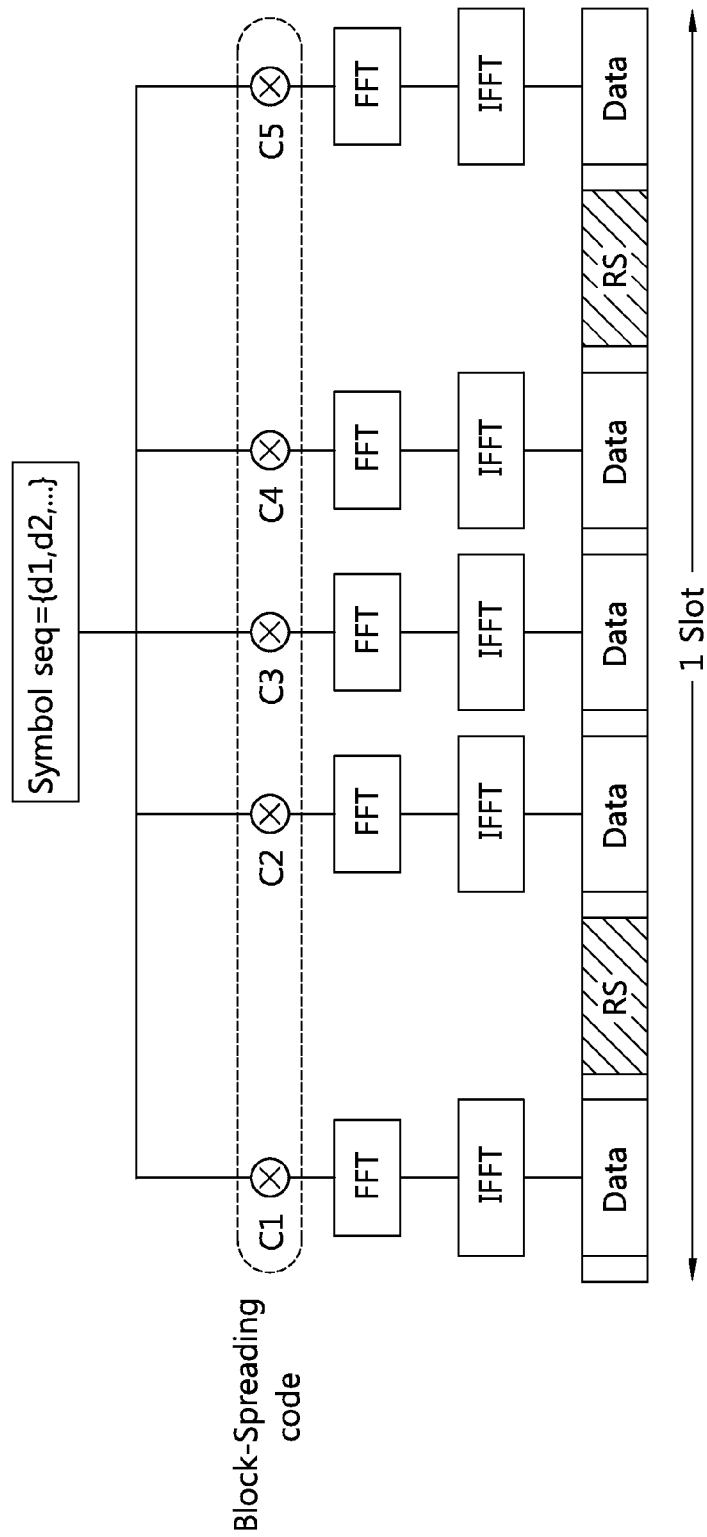
FIG. 13 exemplifies a channel structure of PUCCH format 3.

FIG. 13 exemplifies a channel structure of the PUCCH format 3.

Referring to FIG. 13, a modulated symbol sequence {d1, d2, . . . } to which the block spreading code is spread in the time domain. The block spreading code may be an orthogonal cover code (OCC). Herein, the modulated symbol sequence may be a sequence of the modulated symbols in which the ACK/NACK information bits which are multiple bits are channel-coded (using the RM code, a TBCC, a punctured RM code, and the like) to generate ACK/NACK coded bits, and may be a sequence of modulated symbols in which the ACK/NACK coded bits are modulated (for example, QPSK-modulated). The sequence of the modulated symbols is mapped in data symbols of the slot through fast Fourier transform (FFT) and inverse fast Fourier transform (IFFT) and thereafter, transmitted. FIG. 13 exemplifies a case in which two RS symbols exist in one slot, but three RS symbols may exist and in this case, a block spreading code having a length of 4 may be used.

In the PUCCH format 3, channel-coded bits of 48 bits may be transmitted in the normal CP. When UCI bits (information bits) are 11 bits or less, the (32, A) RM code of Table 4 is used and circular repetition is used to match the coded bit number of the PUCCH format 3. As shown in Table 4, since the (32, A) RM code just has 11 basis sequences, when the UCI bits are more than 11 bits, dual RM coding using two (32, A) RM codes is performed.

Figure 14:
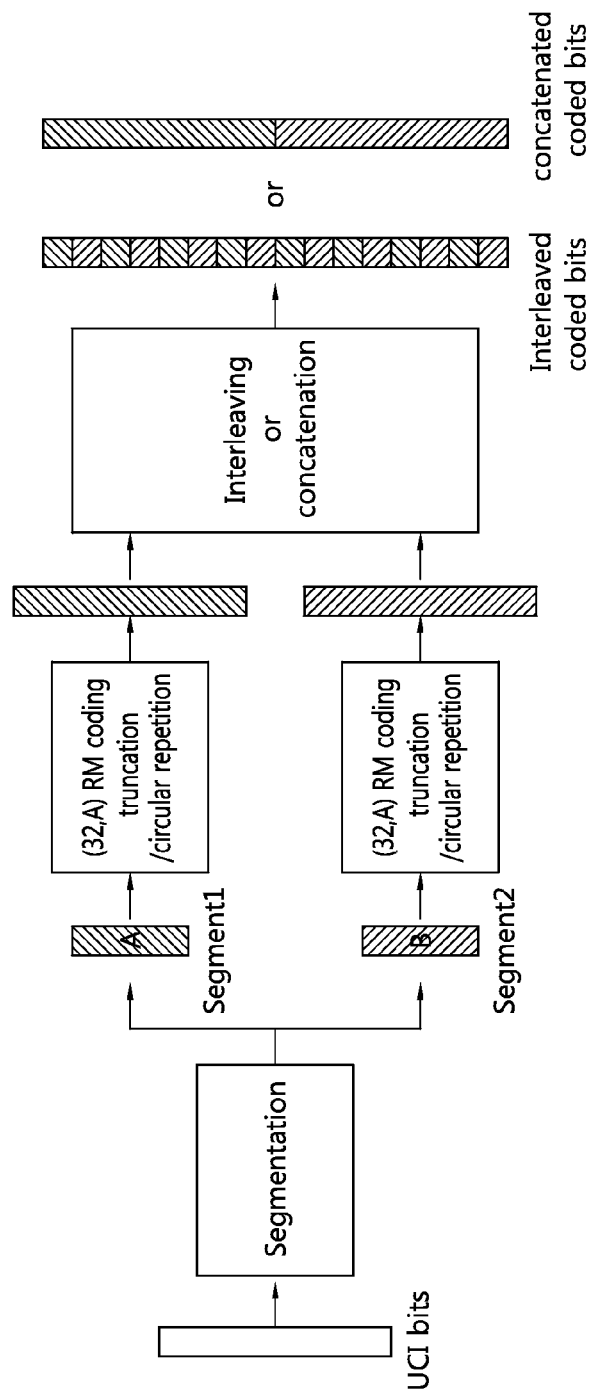
FIG. 14 exemplifies a dual RM coding process.

FIG. 14 exemplifies a dual RM coding process.

Referring to FIG. 14, when a UCI bit stream (information bits) is more than 11 bits, a bit stream (referred to as a segment) segmented through segmentation is generated. In this case, each of segment 1 and segment 2 becomes 11 bits or less. The segments 1 and 2 are interleaved or concatenated through the (32, A) RM coding, respectively. Thereafter, the UCI bit stream is truncated or circularly repeated and then transmitted in order to match the coded bit number of the PUCCH format 3.

[Method for Transmitting Channel Status Information in Wireless Communication System]

A modulation and coding scheme (MCS) and transmission power are controlled according to a given channel by using link adaptation in order to maximally use a channel capacity given in the wireless communication system. In order for the base station to perform the link adaptation, feedback of channel status information of the user equipment is required.

1. Channel Status Information (CSI)

Feedback of channel information is required for efficient communication, and in general, downlink channel information is transmitted through the uplink, and uplink channel information is transmitted through the downlink. Channel information representing a status of a channel is referred to as the channel status information, and the channel status information includes a precoding matrix index (PMI), a rank indicator (RI), a channel quality indicator (CQI), and the like.

2. Downlink Transmission Mode.

The downlink transmission mode may be divided into nine modes to be described below.

Transmission mode 1: Single antenna port, port 0

Transmission mode 2: Transmit diversity

Transmission mode 3: Open loop spatial multiplexing The transmission mode 3 is an open loop mode in which rank adaptation is available based on RI feedback. When a rank is 1, the transmit diversity may be applied. When the rank is larger than 1, a large delay CDD may be used.

Transmission mode 4: Closed loop spatial multiplexing or transmit diversity

Transmission mode 5: Transmit diversity or multi-user MIMO

Transmission mode 6: Transmit diversity or closed-loop spatial multiplexing having a single transmission layer Transmission mode 7: If the number of physical broadcast channel (PBCH) antenna ports is 1, a single antenna port (port 0) is used, and if not, the transmit diversity is used. Alternatively, single antenna transmission (port 5)

Transmission mode 8: If the number of PBCH antenna ports is 1, the single antenna port (port 0) is used, and if not, the transmit diversity is used. Alternatively, a dual layer is transmitted by using antenna ports 7 and 8, or a single antenna port is transmitted by using port 7 or 8.

Transmission mode 9: Transmission of maximum 8 layers (ports 7 to 14).

In the case where there is no multicast-broadcast single frequency network (MBSFN) subframe, if the number of PBCH antenna ports is 1, the single antenna port (port 0) is used, and if not, the transmit diversity is used.

In the case of the MBSFN subframe, a single antenna port (port 7) is transmitted.

3. Periodic Transmission of CSI.

The CSI may be transmitted through the PUCCH periodically according to a cycle determined in the upper layer. The user equipment may be semistatically configured by an upper layer signal so as to periodically feed back a differential CSI (CQI, PMI, RI) through the PUCCH. In this case, the user equipment transmits the corresponding CSI according to modes defined as shown in a table given below.

TABLE 5

| | | PMI Feedback Type | |
| --- | --- | --- | --- |
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

A periodic CSI reporting mode in the PUCCH described below is supported for each of the aforementioned transmission modes.

TABLE 6

| | |
| --- | --- |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | Modes 1-1, 2-1 In the case where PMI/RI reporting is configured to user equipment,; Modes 1-0, 2-0 In the case where PMI/RI reporting is not configured to user equipment |
| Transmission mode 9 | Modes 1-1, 2-1 In the case where PMI/RI reporting is configured to user equipment and the number of CSI-RS ports is larger than 1 Modes 1-0, 2-0 In the case where PMI/RI reporting is not configured to user equipment and the number of CSI-RS ports is 1 |

Meanwhile, a collision of the CSI report represents a case in which a subframe configured to transmit a first CSI and a subframe configured to transmit a second CSI are the same as each other. When the collision of the CSI report occurs, the first CSI and the second CSI are simultaneously transmitted or transmission of a CSI having a low priority is abandoned (this will be referred to as drop), and a CSI having a high priority may be transmitted according to priorities of the first CSI and the second CSI.

The CSI report through the PUCCH may include various report types according to a transmission combination of the CQI, the PMI, and the RI, and a cycle and an offset value divided according to each report type (hereinafter, abbreviated as a type) are supported.

Type 1: Supports CQI feedback for a subband selected by the user equipment.

Type 1a: Supports subband CQI and second PMI feedback.

Types 2, 2b, and 2c: Supports wideband CQI and PMI feedback.

Type 2a: Supports the wideband PMI feedback.

Type 3: Supports RI feedback.

Type 4: Transmits the wideband CQI.

Type 5: Supports RI and wideband PMI feedback.

Type 6: Supports RI and PTI feedback.

For each serving cell, $N_{pd}$ which is a subframe-unit cycle and an offset $N_{offset,CQI}$ are determined based on a parameter 'cqi-pmi-ConfigIndex' ($I_{CQI/PMI}$) for CQI/PMI reporting. Further, for each serving cell, a cycle MRI and a relative offset $N_{offset,RI}$ are determined based on a parameter 'ri-ConfigIndex' ($I_{RI}$) for RI reporting. 'cqi-pmi-ConfigIndex' and 'ri-ConfigIndex' are set by the upper layer signal such as the RRC message. The relative offset $N_{offset,RI}$ for the RI has a value in a set $\{0, -1, \ldots, -(N_{pd}1)\}$.

A subframe in which the user equipment reports the CSI is referred to as a CSI subframe, and a CSI subframe set constituted by a plurality of CSI subframes may be configured for the user equipment. If reporting is configured in two or more CSI subframe sets for the user equipment, 'cqi-pmi-ConfigIndex' and 'ri-ConfigIndex' corresponding to the respective CSI subframe sets are given. For example, when CSI reporting is configured in two CSI subframe sets, 'cqi-pmi-ConfigIndex' and 'ri-ConfigIndex' are for a first CSI subframe set and 'cqi-pmi-ConfigIndex2' and 'ri-ConfigIndex2' are for a second CSI subframe set.

When a CSI report which a CSI type 3, 5, or 6 for one serving cell and a CSI report which is a CSI type 1, 1a, 2, 2a, 2b, 2c, or 4 for one serving cell collide with each other, the CSI report which is the CSI type 1, 1a, 2, 2a, 2b, 2c, or 4 has a low priority and is dropped.

When two or more serving cells are configured for the user equipment, the user equipment performs only CSI reporting for only one serving cell in a given subframe. The CSI report which is the CSI type 3, 5, 6, or 2a of a first cell and the CSI report which is the CSI type 1, 1a, 2, 2a, 2b, 2c, or 4 of a second cell may collide with each other in the given subframe. In this case, the CSI report which is the CSI type 1, 1a, 2, 2a, 2b, 2c, or 4 has the low priority and is dropped.

A CSI report which is CSI type 2, 2b, 2c, or 4 of the first cell and a CSI report which is CSI type 1 or 1a of the second cell may collide with each other in the given subframe. In this case, the CSI report which is the CSI type 1 or 1a has the low priority and is dropped. The first cell and the second cell are different cells.

CSI reports of the CSI types having the same priority in different serving cells may collide with each other in the given subframe. In this case, a CSI of a serving cell having the lowest serving cell index ServCellIndex is reported, and CSIs of all other serving cells are dropped.

Hereinafter, the present invention will be described.

In the LTE, in a specific subframe, CQI transmission and ACK/NACK transmission periodically collide with each other, simultaneous transmission of the periodic CQI and the ACK/NACK may be configured. If the specific subframe is a subframe without the PUSCH, the ACK/NACK is multiplexed by a method of phase-modulating a second reference signal symbol of the PUCCH format 2 in which the CQI is transmitted.

However, in the specific subframe, in the case where there is no PUSCH transmission and the transmission of the periodic CQI and the plurality of ACK/NACKs (for example, the plurality of ACK/NACKs for the plurality of subframes/cells) is required, such an existing method is not proper. The reason is that it is difficult to ensure reliability by the existing method due to a large ACK/NACK information amount. Accordingly, in the subframe without the PUSCH transmission, a new method of multiplexing and transmitting the periodic CSI and the ACK/NACK through the PUCCH is required.

In the present invention, a multiplexing method when the periodic CSI and the ACK/NACK (particularly, the plurality of ACK/NACKs) are multiplexed and simultaneous transmission is configured to the same uplink control channel, and an uplink control channel selection method according to the UCI configuration are proposed.

Hereinafter, the CSI may be limited to the periodic CSI other than aperiodic CSI. Hereinafter, for convenience of the description, the RM coding is used as the channel coding, but is not limited thereto. Further, the CSI transmission in the case where the plurality of CSIs is configured to be simultaneously transmitted may be included. Further, in the case of using a plurality of RM codings, the dual RM coding in which two RM coding blocks are used is exemplified, but it is not limited that two or more RM coding blocks (alternatively, different block coding schemes) are used. The PUCCH format 3 is exemplified as the UL channel to which the channel-coded control information is transmitted, but is not limited thereto, and a case where the PUCCH format 3 is modified may also be applied. For example, a PUCCH format 3 which is modified by removing a spreading factor from the PUCCH format 3 may also be applied. Further, in some cases, the present invention may also be applied to a case of transmitting the UCI through the PUSCH. Further, in the drawing illustrating a bit field, the leftmost side represents a most significant bit (MSB), and the rightmost side represents a least significant bit (LSB).

I. Distributed Arrangement According to a Priority for Each UCI Type During UCI Channel Coding-UCI Joint Coding Due to the characteristic, the RM coding is good for decoding performance when a basis sequence index (BSI) is coded with a low basis sequence. In Table 4, a basis sequence having the lowest BSI is $M_{i,0}$, and a basis sequence having the highest BSI is $M_{i,10}$. Accordingly, in the case where importance thereof varies according to the UCI type, a UCI having high importance may be arranged to be coded through the basis sequence having the lowest BSI. That is, an order of an input bit stream of the RM coding may be concatenated in an order of a UCI having high importance to be multiplexed.

For example, in the UCI, when the importance is high in an order of the ACK/NACK, the SR, and the CSI, the input bits of the RM coding are arranged to be concatenated in the order of the ACK/NACK, the SR, and the CSI based on the MSB. In the case where SR transmission is not required, the input bits are arranged in the order of the ACK/NACK and the CSI. In this case, even in RI series, PMI series, and CQI series additionally constituting the CSI, importance thereof may be divided. In this case, the CSI may configure input bits of the RM coding in an order to the importance thereof.

The importance for each UCI type may be variously set according to a system. For example, the importance may be in the order of the CSI, the ACK/NACK, and the SR, the order of the RI, the ACK/NACK, the SR, the PTI, and the CQI, or the order of the RI, the PTI, the ACK/NACK, the SR, and the CQI. That is, the importance for each UCI type may be determined by various references such as an effect on a system throughput and efficiency of UL control channel resource application.

When a payload sum of the UCIs constituting the input bit stream of the RM coding exceeds 11 bits (that is, the UCI information bit (that is, the UCI information bits exceed 11 bits, a maximum bit number of the UCI information bits may be limited to 21 bits or 22 bits), in the case of a single RM, since the basis sequence is insufficient, dual RM is used. In this case, how concatenated UCI bit streams are segmented according to the importance for each UCI type is a problem.

Figure 15:
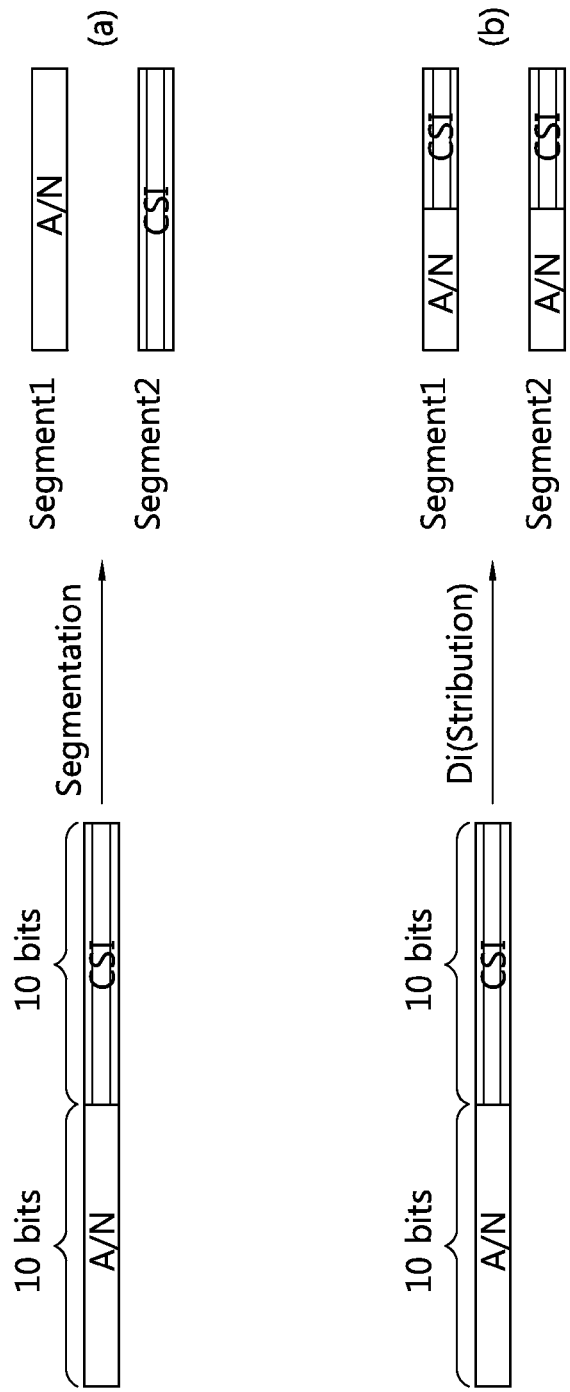
FIG. 15 exemplifies a method of dividing a UCI bit stream.

FIG. 15 exemplifies a method of segmenting UCI bit streams.

Referring to FIG. 15A, for example, when the leftmost bit is called a most significant bit, UCI bit streams concatenated in an order of the ACK/NACK and the CSI from the left side are simply segmented with the same bit number. A segment 1 and a segment 2 generated by the simple segmentation are RM-coded by (32, A) RM codes, respectively. As such, when the UCI bit streams are simply segmented, the UCI bit streams may be arranged so that a UCI having high importance is coded with a basis sequence of an RM code having a higher BSI than a UCI having low importance. For example, even though the ACK/NACK has higher importance than the CSI, when the ACK/NACK is simply segmented to the segment 1 and the CSI is simply segmented to the segment 2, a result occurs, in which the right bits of the segment 1 are coded with the basis sequence of the RM code having the higher BSI than the left bits of the segment 2.

In order to prevent the result, as illustrated in FIG. 15B, in the UCI bit stream, the UCI having high importance, for example, the ACK/NACK bits are distributed and arranged at left sides (MSB sides) of the segment 1 and the segment 2, and the UCI having low importance, for example, the CSI bits may be distributed and arranged (this is called distributed segment or distributed mapping) at the next to the ACK/NACK bits of each segment.

A segment 1 and a segment 2 generated by the distributed segmentation are RM-coded with (32, A) RM codes, respectively. By using such a distributed segmentation method, the ACK/NACK bits in each segment are coded with the RM basis sequence having a lower BSI. Accordingly, decoding performance of the receiving side may be increased. The distributed segment may be implemented by introducing the interleaver before the segmentation.

Figure 16:
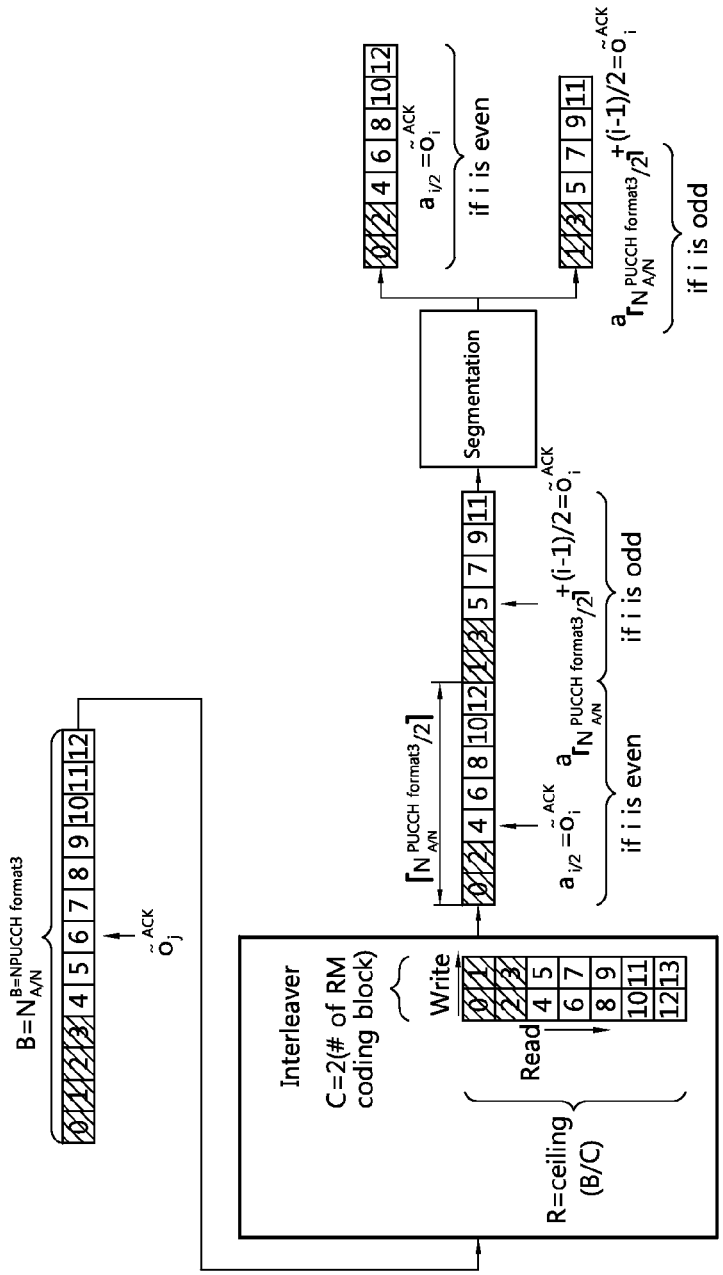
FIG. 16 is a diagram illustrating an example of an interleaver.

FIG. 16 is a diagram illustrating an example of an interleaver.

With respect to B bit streams, the interleaver first writes columns (that is, a method of moving to the next row index after increasing a column index) and reads rows (that is, a method of moving the next column index after increasing a row index). When the number of columns of the interleaver is C, in the case of dual RM, C=2. If two or more RM coding blocks are used, C becomes the number of RM coding blocks.

As illustrated in FIG. 16, a bit stream constituted by B bits is interleaved, and then even-numbered bits are arranged to the MSB side, and odd-numbered bits are arranged to the LSM side. That is, the interleaved bit stream may be segmented into segments constituted by only the even-numbered bits and segments constituted by only the odd-numbered bits. Alternatively, the interleaving and the segmenting may be simultaneously performed.

Meanwhile, in order to satisfy a required error rate for each UCI type, in the case of the ACK/NACK, additional channel coding may be performed. That is, first, primary channel coding is performed in the ACK/NACK, and thereafter, secondary channel coding may be performed together with other UCIs. For example, in the case of a 1-bit ACK/NACK for each component carrier (CC), repeated coding is performed by the primary channel coding, and in the case of a 2-bit ACK/NACK for each component carrier, simplex coding is performed by the primary channel coding and then joint coding may be performed by the secondary channel coding together with other UCIs.

In the case where a size of the ACK/NACK payload (that is, the ACK/NACK information bits) is large, the primary channel coding is applied, and as a result, the bit number which may transmit the CSI is decreased, and it is inefficient. Accordingly, the primary channel coding and the second channel coding may be restrictively applied. For example, only when the ACK/NACK is a specific bit number or less or a specific combination, the primary channel coding and the second channel coding may be applied. For example, 1) an ACK/NACK in the case where the ACK/NACK of the primary cell (alternatively, the ACK/NACK for the case of receiving the ARI) and the CSI are simultaneously transmitted, 2) an ACK/NACK in the case where the sum of the CSI simultaneously transmitted is a predetermined bit number or less, and 3) an ACK/NACK in the case where the primary channel coding is designated to the RRC are included.

A target of the primary channel coding is not limited to the ACK/NACK, and may be applied to all the UCI having high importance such as RI series.

II. Method of Ensuring ACK/NACK Transmission Resource During UCI Joint Coding

The periodic CSI is reported according to a cycle set by the upper layer signal between the base station and the user equipment. Accordingly, there is no ambiguity between the base station and the user equipment with respect to the existence of the CSI. Meanwhile, in the case of the ACK/NACK, there is possibility that the user equipment does not receive scheduling information (for example, the PDCCH) scheduling the PDSCH. In this case, in the UL subframe to which the ACK/NACK is transmitted, the base station excludes the ACK/NACK for the PDSCH, but since the user equipment does not receive the scheduling information itself, an error that the ACK/NACK is not transmitted at all may occur.

However, when the ACK/NACK and the CSI are multiplexed and transmitted by using the same format (for example, the PUCCH format 3) and the same source as the case of transmitting only the CSI, in the error situation, the ambiguity for whether the UCI includes not the ACK/NACK+CSI but only the CSI may occur in the base station.

Accordingly, in the case of the UCI information that the ambiguity for the presence or absence, the presence or absence of the bit field site for the corresponding UCI information may be determined. However, in the case of the UCI information having the ambiguity for the presence or absence, regardless of the presence or absence of the UCI information, one method of reducing the error is to ensure the bit field for the corresponding UCI information.

For example, in the UL subframe where the user equipment does not transmit the periodic CSI, even though the ACK/NACK is transmitted by using all the resources in the PUCCH format 3 allocated to the user equipment, the error does not occur. The reason is that there is no ambiguity between the base station and the user equipment with respect to the presence or absence of the periodic CSI. Meanwhile, in the case of transmitting the CSI in the UL subframe without the ACK/NACK transmission, even though there is no ACK/NACK to be transmitted, the CSI is mapped in the remaining resources except for the resource where the maximum ACK/NACK information which is generable in the corresponding configuration is mapped.

Figure 17:
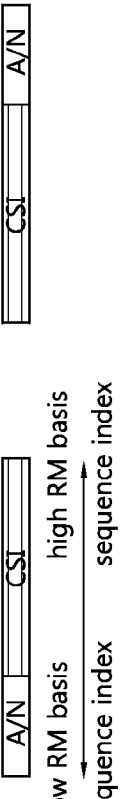
FIG. 17 illustrates an example of a resource layout when the ACK/NACK and the CSI are multiplexed and transmitted.

FIG. 17 illustrates an example of a resource layout when the ACK/NACK and the CSI are multiplexed and transmitted.

Referring to FIG. 17A, when the ACK/NACK and the CSI are present, multiplexed, and transmitted, the ACK/NACK and the CSI are concatenated in the order of the ACK/NACK and the CSI, the ACK/NACK is coded by the RM basis sequence having the low BSI, and the CSI is coded by the RM basis sequence having the high BSI. In the case where the ACK/NACK is absent and only the CSI is present, the bit field of the ACK/NACK is empty, and the CSI bits are arranged. Accordingly, since resource efficiency is decreased and the CSIs are not coded by the RM basis sequence having the low BSI, there is a problem in that the decoding performance may deteriorate. Further, in the case where only the ACK/NACK is absent, the ACK/NACKs are arranged in the ACK/NACK bit field or the entire bit field.

As one method for solving the problem, as illustrated in FIG. 17B, the UCI in which the ambiguity for the presence or absence does not exist, for example, the CSI is first arranged, and the UCI in which the ambiguity exists, for example, the ACK/NACK may be next arranged. In this case, when only the CSI is present, the CSI is coded by the RM basis sequence having the low BSI, and as a result, it is effective that the decoding performance is improved.

In the case of the SR, like the periodic CSI, a SR transmittable subframe is configured and thus there is no ambiguity for the presence or absence of the SR bits. Therefore, the aforementioned rules may be followed. For example, when the SR and the ACK/NACK are simultaneously transmitted, the SR is first arranged and the ACK/NACK is next arranged. Since there is no ambiguity in the SR and the CSI when the SR and the CSI are simultaneously transmitted, any one of an order of the SR and the CSI or an order of the CSI and the SR may be used. When the SR, the CSI, and the ACK/NACK are simultaneously transmitted, the SR, the CSI, and the ACK/NACK may be arranged in the order of the CSI, SR, ACK/NACK or the order of the SR, CSI, ACK/NACK.

Meanwhile, for backward compatibility with the existing system, the SR may be exceptively arranged next to the ACK/NACK in spite of the UCI without the ambiguity. Accordingly, when the SR and the ACK/NACK are simultaneously transmitted, the SR and the ACK/NACK may be arranged in the order of the ACK/NACK, SR. When the SR and the CSI are simultaneously transmitted, the SR and the CSI may be arranged in the order to the CSI, SR. Accordingly, when the SR, the CSI, and the ACK/NACK are simultaneously transmitted, the SR, the CSI, and the ACK/NACK may be arranged in the order of the CSI, ACK/NACK, SR.

Hereinafter, a method of determining a bit number of the CSI field which may be applied to a case where the arrangement order of the UCI is the order of the CSI and the ACK/NACK from the MSB.

The plurality of DL cells is configured in the user equipment, and a CSI reporting mode configured in each DL cell may be configured as follows. That is, when the CSIs for one or more DL cells collide with each other in a subframe n configured so that the CSI is transmitted, the CSI reporting mode may be configured so that only the CSI for one DL cell may be transmitted and the CSIs for the remaining DL cells are dropped. In this case, the bit number of the CSI field arranged in the UCI may be one of next 1 to 4.

1. Bit number of CSI selected according to a priority rule among the CSIs colliding with each other in the subframe n 2. Maximum CSI bit number of i) the CSI of the secondary cell except for the CSI having a lower priority than the CSI of the primary cell among the CSIs for the secondary cell and ii) the CSI of the primary cell, among the CSIs colliding with each other in the subframe n. (That is, max{bit number of CSI of secondary cell having higher priority than CSI of primary cell, bit number of CSI of primary cell})

3. Maximum CSI bit number in CSIs colliding with each other in subframe n (that is, maximum value in frequency axis as maximum value among CSIs for respective DL cells).

4. Maximum value of CSI bit number for DL cell to be transmitted to one subframe in CSI reporting mode configured in each of plurality of DL cells configured to user equipment (that is, maximum value in time-frequency axis).

Meanwhile, the CSI reporting mode configured in each of the plurality of DL cells configured in one user equipment may be configured so that the CSIs for the corresponding DL cell are multiplexed and transmitted when the CSIs for one or more DL cells having corresponding transmission periods collide with each other in the subframe n configured so that the CSI is transmitted. In this case, the bit number of the CSI may be determined by one of 5 to 7 as follows.

5. Sum of bit numbers of CSIs to be transmitted among CSIs colliding with each other in subframe n, 6. Sum of CSI bit numbers of CSIs colliding with each other in subframe n, 7. Maximum value of CSI bit number for DL cell to be transmitted to one subframe in CSI reporting mode configured in each of plurality of DL cells configured to user equipment (that is, maximum value in time-frequency axis).

After configuring the CSI field according to the CSI bit number determined by one of 1 to 7, the bits of the CSI selected to be transmitted is mapped from the MSB of the CSI field, and may be filled with '0' in the case where the bits of the CSI field remain.

When the bit number of the CSI field is determined, a target of the CSI collision becomes all the configured DL cells regardless of activation/deactivation, but may be limited to the activated DL cells. In the case of configuring and using the CSI field with a semistatically fixed bit number, a size of the CSI field is fixed regardless of a change of the CSI bit number to be actually transmitted. Accordingly, even though misrecognition between the base station and the user equipment occurs with respect to cell activation/deactivation, it is advantageous that the error does not occur with respect to position recognition of the ACK/NACK and the SR.

III. Classification of Transmission Sources According to UCI Transmission Combination As described above, in the case of multiplexing and transmitting the ACK/NACK (including the SR) and the CSI and transmitting only the CSI, when the same format (for example, PUCCH format 3) and the same resource is used, the ambiguity may occur according to the presence or absence of the ACK/NACK. In order to solve the ambiguity, as described above, in the method of arranging the UCI without the ambiguity for the presence or absence, a coding method needs to be determined by ensuring the resource for the UCI which is not actually transmitted, and there is a problem in that a result in which the information such as the CSI which does not have ambiguity but has decreased importance is coded with the RM basis sequence having the low BSI.

Accordingly, in the case of multiplexing and transmitting the ACK/NACK and the CSI and transmitting only the CSI, the present invention provides a transmitting method using different formats (for example, the PUCCH format in the case of transmitting only the CSI, and the PUCCH format 3 in the case of multiplexing and transmitting the ACK/NACK and the CSI) or a transmitting method by allocating the resources exclusively divided even though the same format (for example, the PUCCH format 3) is used.

For example, when the UL subframe to be transmitted is the subframe n, in the DL subframe (subframe n−k) corresponding to the subframe n, the user equipment i) configures a UCI constituted by only the CSI and uses a first source in the case where only the CSI needs to be transmitted in the UL subframe by not detecting the DL channel in which the ACK/NACK response is required, and ii) configures a UCI constituted by the ACK/NACK+CSI and uses a second source in the case where the ACK/NACK and the CSI needs to be multiplexed and transmitted together in the UL subframe by detecting the DL channel in which the ACK/NACK response is required.

The first resource and the second resource will be described.

Figure 18:
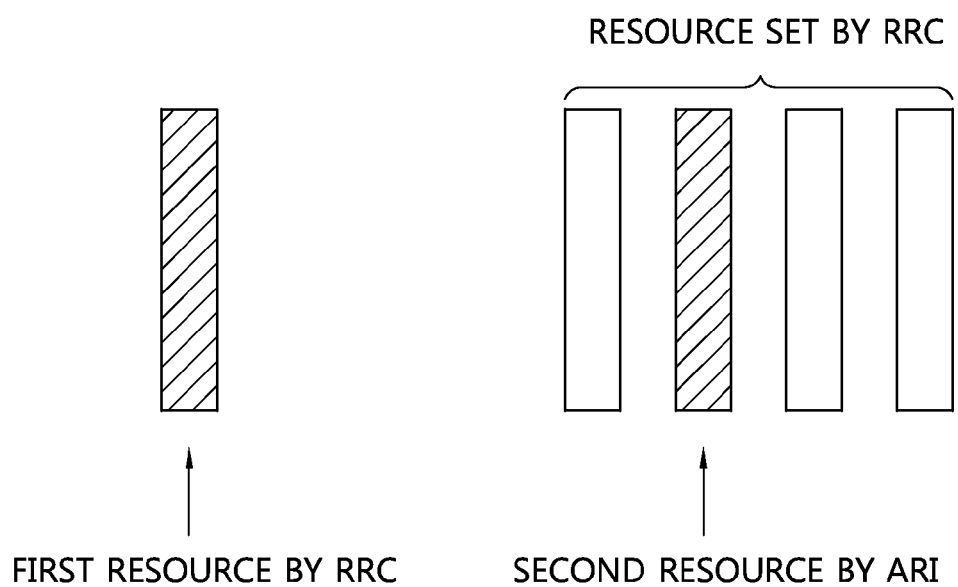
FIG. 18 exemplifies a first source and a second source.

FIG. 18 exemplifies a first source and a second source.

The first source and the second source mean resources or formats which are exclusively divided.

The first source may be one fixed resource pre-allocated to the RRC. In addition, the second resource may be a plurality of resources (for example, four resources) pre-allocated to the RRC, that is, resources indicated by the DL channel requiring the ACK/NACK in a resource set, for example, specific bits (that is, ARI (2 bits), and may be bits to dedicate a transmission power control field) transmitted through a control channel (PDCCH) scheduling the SPS release PDCCH or the PDSCH in which the ACK/NACK is required.

The user equipment may select the first resource or the second resource through the ARI detection of the DL channel.

For example, the user equipment may select the first resource or the second resource according to whether the ARI is received from the DL channel. For example, a UL subframe in which the PUCCH format 3 is configured to transmit the ACK/NACK to the user equipment, and the ACK/NACK transmission is configured together with the periodic CSI will be assumed. When the PUCCH format 3 resource (second resource) is indicated by the ARI in the DL channel requiring the ACK/NACK or the PDCCH scheduling the DL channel, the user equipment joint-codes and multiplexes the ACK/NACK (including the SR) and the periodic CSI for one cell up to 22 bits, and transmits the ACK/NACK and the periodic CSI through the PUCCH format 3 resource (the second resource) indicated by the ARI. On the other hand, if there is no ARI, the user equipment transmits the UCI constituted by only the periodic CSI through the first resource pre-assigned by the RRC.

According to the aforementioned method, in the case of transmitting the ACK/NACK and the periodic CSI together and the case of transmitting only the periodic CSI, separated resources are used, and as a result, the ambiguity does not occur in terms of the base station. Accordingly, the UCI may be transmitted with reliability and effectively.

Meanwhile, in methods of allocating the first source and the second source, the following resource allocation methods may be configured according to the number of targeted CCs of the ACK/NACK and/or ACK/NACKs or the acquirement of the ARI.

1) In the case of transmitting an ACK/NACK for 'a combination of a first ACK/NACK target' (referred to as 'ACK/NACK combination 1' or a first ACK/NACK combination) and the CSI together, a UCI constituted by ACK/NACK combination 1 and the CSI is configured and the first resource is used, and 2) in the case of transmitting an ACK/NACK for 'a combination of a second ACK/NACK target' (referred to as 'ACK/NACK combination 2' or a first ACK/NACK combination) and the CSI together, a UCI constituted by ACK/NACK combination 2 and the CSI is configured and the second resource is used.

The first ACK/NACK target combination and the second ACK/NACK target combination may be determined below.

1) The target of the ACK/NACK which may not acquire the ARI because the ACK/NACK is required and the PDCCH including the ARI is not present becomes the first ACK/NACK target combination. The target of the ACK/NACK which may acquire the ARI because the ACK/NACK is required and the PDCCH including the ARI is present becomes the second ACK/NACK target combination.

2) The first ACK/NACK target combination and the second ACK/NACK target combination according to the number of ACK/NACK target CCs and/or ACK/NACKs may be determined below.

a) In an FDD, in the case of being configured to use the PUCCH format 3 for the ACK/NACK transmission for multiple CCs or in the case of being configured to use a PUCCH format 1a/1b channel selection for the ACK/NACK transmission for multiple CCs, in the UL subframe transmitting the CSI, the ACK/NACK transmission is required, and in the DL subframe corresponding to the UL subframe, i) in the case where one PDSCH is present in only the PCC and scheduled without the PDCCH, ii) in the case where one PDSCH is present in only the PCC and scheduled with the PDCCH, and iii) in the case where one PDSCH is present in only the PCC and the ACK/NACK response is required, the corresponding PDCCH becomes the first ACK/NACK target combination (accordingly, the ACK/NACK combination 1 (the first ACK/NACK target combination) may be referred to as a single ACK/NACK, and may be referred to as an ACK/NACK for the data unit received from one downlink cell). In other cases, the corresponding PDCCH becomes the second ACK/NACK target combination (accordingly, the ACK/NACK combination 2 (the second ACK/NACK combination) may be referred to as multiple ACK/NACKs, and may be multiple ACK/NACKs for the plurality of data units received from the plurality of downlink cells).

b) In the TDD, in the case of being configured to use the PUCCH format for the ACK/NACK transmission for multiple CCs or in the case of being configured to select the PUCCH format 1a/1b channel for the ACK/NACK transmission for multiple CCs, the ACK/NACK transmission is required in the UL subframe (subframe n) transmitting the CSI for the DL CC, in the DL subframe (subframe n−k, k is a component of a set K, and K is defined by 3GPP TS 36.213 V10, Evolved Universal Terrestrial Radio Access (E-UTRA); Physical layer procedures (Release 10) table 10.1.3.1-3 as a set configured by M components) corresponding to the UL subframe, i) in the case where one PDSCH scheduled without the PDCCH is present only in the PCC and there is no PDCCH requiring the ACK/NACK response, ii) in the case where one PDSCH scheduled with the PDCCH is present only in the PCC and the DAI of the PDSCH is 1, iii) in the case where one PDCCH having the DAI of 1, which requires the A/N response is present and there is no PDSCH, and iv) in the case where one PDCCH having the DAI of 1, which requires the A/N response is present or one PDSCH scheduled with the PDCCH is present only in the PCC and the DAI of the corresponding PDCCH is 1, and one PDSCH having the DAI of 1 of the corresponding PDCCH and scheduled without the PDCCH is present, in the i) to iv), the corresponding PDCCH becomes the first ACK/NACK target combination (accordingly, the ACK/NACK target combination 1 (the first ACK/NACK target combination) may be referred to as a single ACK/NACK, and may be referred to as an ACK/NACK for the data unit received from only one subframe of one specific downlink cell). In other cases, the corresponding PDCCH becomes the second ACK/NACK target combination (accordingly, the ACK/NACK combination 2 (the second ACK/NACK combination) may be referred to as multiple ACK/NACKs, and may be multiple ACK/NACKs for the plurality of data units received from the plurality of downlink cells).

c) In the TDD, in the case of being configured to select the PUCCH format 1a/1b channel for the ACK/NACK transmission for multiple CCs, the ACK/NACK transmission is required in the UL subframe (subframe n) transmitting the CSI for the DL CC, and in the case of receiving the PDSCH in the PDD or the PDCCH requiring the ACK/NACK response in the DL subframe (subframe n−k) corresponding to the UL subframe, the corresponding PDCCH becomes the first ACK/NACK target combination (accordingly, the ACK/NACK combination 1 (the first ACK/NACK combination) may be referred to as a single ACK/NACK), and in other cases, the corresponding PDCCH becomes the second ACK/NACK target combination (accordingly, the ACK/NACK 2 (the second ACK/NACK combination) may be referred to as multiple ACK/NACKs.

Figure 19:
FIG. 19 illustrates an example of an UCI configuration in the first source and the second source.
Figure 19:
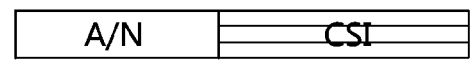

FIG. 19 illustrates an example of an UCI configuration in the first source and the second source.

Referring to FIG. 19, the second resource is a resource when the ACK/NACK and the periodic CSI are transmitted together, and the ACK/NACK and the periodic CSI are arranged. The first resource ensures a resource for the ACK/NACK combination 1 even in the case where only the CSI is generated without detecting the first ACK/NACK target combination. This is to prepare for a situation in which the ambiguity between the base station and the user equipment occurs when the base station transmits the DL channel requiring the ACK/NACK response, but the user equipment fails to detect the DL channel. This method is similar to a method of ensuring the ACK/NACK resource regardless of the detection of an actual ACK/NACK response target channel, but the ACK/NACK combination 1 has an advantage of reducing waste of resources in that only the ACK/NACK resources for basic communication between the base station and the user equipment are ensured.

For example, in the case of the FDD, when a DL transmission mode of the PCC is a single codeword transmission mode, 1 bit is ensured, and when the DL transmission mode of the PCC is a multiple codeword transmission mode, 2 bits are ensured, and as a result, the ensured bits may be used in the case of the PCC scheduling. In the TDD, the transmission may be performed by using 1 bit (the single codeword transmission mode) or 2 bits (the multiple codeword transmission mode) for the ACK/NACK response for one channel transmitted to the PCC in one UL subframe or ensuring 2 bits for the ACK/NACK response for multiple channels transmitted to the PCC. Further, in an SR subframe, an SR bit field may also be included in the 'ACK/NACK combination 1'.

At a 2-bit ACK/NACK site, compression transmission may be performed by applying an ACK/NACK bundling (for example, spatial bundling or/and logic AND operation application, a contiguous ACK counter, and the like) method.

In the TDD, considering a case where the ACK/NACK in which the PDCCH (e.g., SPS release PDCCH) having DAI (Downlink Assignment Index)=1 requiring the ACK/NACK response or one PDSCH scheduled with the PDCCH is present in only the PCC and DAI of the corresponding PDCCH is 1, and the ACK/NACK for the PDSCH (e.g., the PDSCH scheduled by the SPS scheme) scheduled without the PDCCH are simultaneously generated, 2 bits or more may be ensured and transmitted in order to transmit each ACK/NACK. For example, in the multiple codeword transmission mode, after 3 bits are ensured, the first bit may be used as the PDSCH scheduled without the PDCCH, and the remaining 2 bits may be used as the ACK/NACK for the PDSCH of DAI=1 or the SPS release PDCCH of DAI=1. In the single codeword transmission mode, after 2 bits are ensured, 1 bit may be used as the TDSCH scheduled without the PDCCH', and the remaining 1 bit may be used as the ACK/NACK for the PDSCH of DAI=1 or the SPS release PDCCH of DAI=1.

The ACK/NACK bits may be mapped in an order of pre-fixed bits according to a condition of the ACK/NACK target like the example.

In the ensuring of the source, a method of ensuring the resource by rate-matching the CSI when the ACK/NACK is multiplexed with the CSI, and a method of ensuring the resource by puncturing the CSI may be included. In both methods, the base station does not attempt to detect the CSI information with respect to a resource RE in which the ACK/NACK is mapped. Further, in an SR subframe, an SR bit field may also be included in the 'ACK/NACK combination 1'.

The TDSCH scheduled with the PDCCH' is 2-codeword transmission, and in the case of being transmitted with the ACK/NACK response for 'the PDSCH scheduled without the PDCCH' together, the ACK/NACK response for the 2 codewords may be spatially bundled.

Meanwhile, when the ACK/NACK combination 1 is maximum 2 bits, a reference signal of the PUCCH format 3 may be modulated (that is, the ACK/NACK is modulated in the second reference signal of each slot) like the PUCCH format 2a/2b instead of ensuring the bit field for the ACK/NACK combination 1. This has an advantage of avoiding the limitation to the bit use of the CSI from occurring according to bit field occupation.

In detail, since an existing PUCCH format 3 uses a code book having 11 basis sequences, when using the dual RM, information of maximum 22 bits may be transmitted, and when a maximum bit number of the periodic CSI for one DL cell is 11 bits, the CSI for two DL cells may be transmitted. However, in the case of reserving the resource for the ACK/NACK combination 1, the limitation on the CSI transmission may occur.

Meanwhile, as a method of preventing usage limit of the CSI bits according to reservation of the bit field for the ACK/NACK and the SR, using Table 3 in which the basis sequences are 13 and rate-mating may be considered, instead of using Table 4 in which the basis sequences are 11 as the RM basis sequence of the existing PUCCH format 3. This may be applied to the single RM and the dual RM, or only the dual RM using.

Further, this may be applied to the PUCCH format 3 resource used for 'ACK/NACK combination 1'. Further, for the dual RM, a method of adding one or two RM basis sequences may be considered.

Meanwhile, the ACK/NACK bit number of the ACK/NACK combination 2 is determined according to the number of DL CCs configured to the user equipment as the maximum number of ACK/NACKs which is generable in the UL subframe and a transmission mode in each DL CC, and in the TDD, the ACK/NACK bit number is determined by additionally adding the number of DL subframes corresponding to one UL subframe.

Alternatively, the configuration of the ACK/NACK combination 2 may be reduced to an activated cell among the DL cells configured to the user equipment in the CSI transmission subframe. That is, in the case of a deactivated cell, there is no possibility that the PDSCH may be scheduled in the corresponding cell, and the CSI is transmitted to only the activated cell. This may be equally applied to when transmitted to the PUCCH and when transmitted to the PUSCH, or applied to only one thereof.

Figure 20:
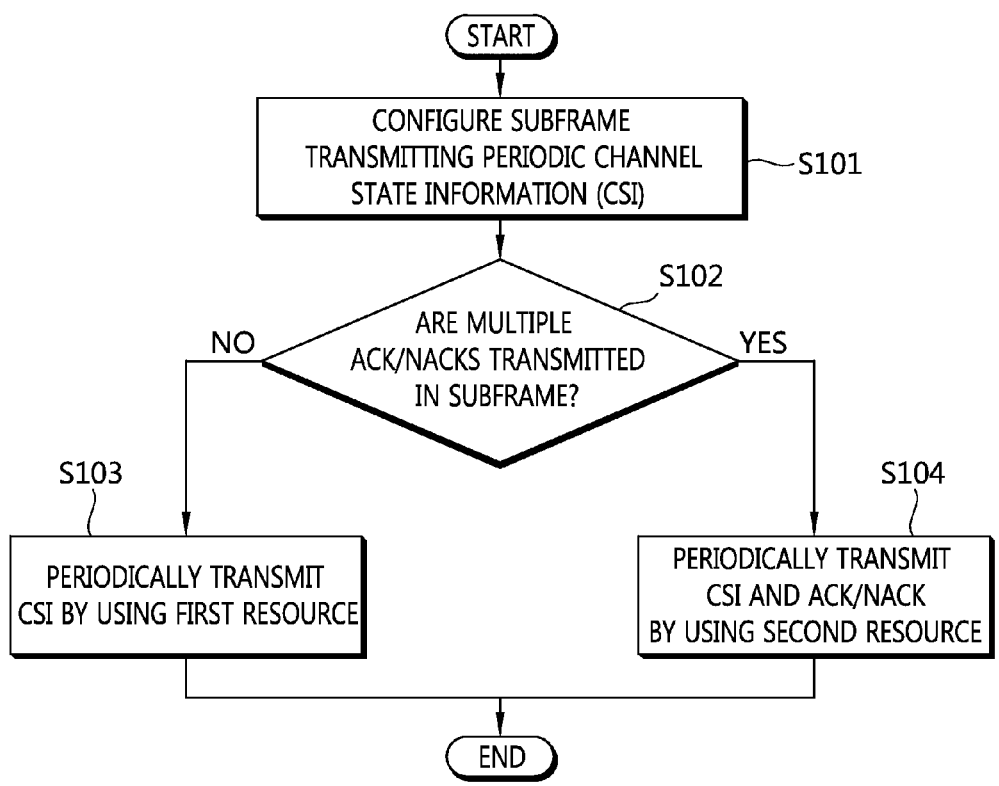
FIG. 20 illustrates an example of a method for transmitting a UCI of user equipment.

FIG. 20 illustrates an example of a method for transmitting a UCI of user equipment.

Referring to FIG. 20, the user equipment receives the subframe transmitting the periodic CSI from the base station (S101).

The user equipment determines whether multiple ACK/NACKs are transmitted in the subframe (S102). The multiple ACK/NACKs may mean a plurality of ACK/NACKs for a plurality of data units received from a plurality of downlink cells, and for example, may mean the ACK/NACK combination 2.

In the subframe, when the multiple ACK/NACKs are not transmitted, the user equipment transmits the periodic CSI by using the first resource (S103). In the case of transmitting the periodic CSI by using the first resource, an information bit stream including the periodic CSI is channel-coded, the information bit stream includes a field including the periodic CSI and a field reserved for the ACK/NACK, and the field including the periodic CSI is allocated earlier than the field reserved for the ACK/NACK based on a most significant bit (MSB) of the information bit stream. In the case of including scheduling request (SR) bits in the information bit stream, the SR bits may be allocated earlier than the field reserved for the ACK/NACK based on the MSB of the information bit stream. This will be described with reference to FIGS. 21 and 22.

In the subframe, when the multiple ACK/NACKs are transmitted together with the periodic CSI, the multiple ACK/NACKs and the periodic CSI are transmitted by using the second resource (S104). In the case of multiplexing and transmitting the periodic CSI and the ACK/NACK (acknowledgement/not-acknowledgement) by using the second resource, an information bit stream including the periodic CSI and the ACK/NACK is channel-coded, and the information bit stream may be configured in an order of the field including the ACK/NACK and the field including the periodic CSI based on the MSB. In the case of including scheduling request (SR) bits in the information bit stream, the SR bits may be allocated earlier than the field including the periodic CSI based on the MSB of the information bit stream. This will be described with reference to FIGS. 21 and 22.

The first resource and the second resource are described above.

Figure 21:
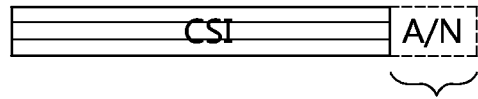
FIG. 21 is an example illustrating an arrangement order on information bits of the ACK/NACK and the CSI which are transmitted through the first source and the second source.
Figure 21:
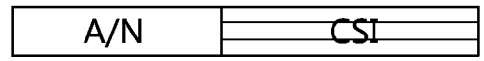

FIG. 21 is an example illustrating an arrangement order on information bits of the ACK/NACK and the CSI which are transmitted through the first source and the second source.

Referring to FIG. 21, on the assumption of a case of using the PUCCH format 3, in a bit field of the UCI transmitted by using the first source, the CSI is first arranged based on the MSB, and the ACK/NACK may be arranged next. The reason is that the first resource is a resource mainly allocated for transmitting the CSI. Accordingly, the ACK/NACK (for example, the ACK/NACK combination 1) in which the ambiguity between the base station and the user equipment may occur in the presence or absence of the occurrence may be allocated after the CSI. On the contrary, in a bit field of the UCI transmitted by using the second source, the CSI may be arranged after the ACK/NACK is first arranged.

Figure 22:
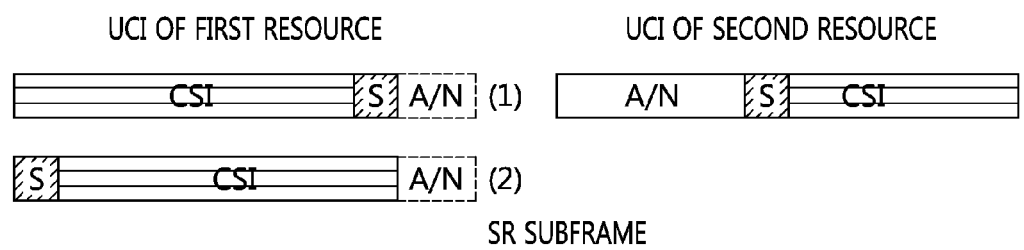
FIG. 22 is an example illustrating an arrangement order information bits of the ACK/NACK, the CSI, and the SR which are transmitted through the first source and the second source.

FIG. 22 is an example illustrating an arrangement order of the ACK/NACK, the CSI, and the SR which are transmitted through the first source and the second source.

Referring to FIG. 22, in the case of transmitting the UCI by using the first source, the CSI and the ACK/NACK are sequentially arranged in the bit field of the UCI. In this case, in the SR subframe to which the SR is transmitted, the CSI, the SR, and the ACK/NACK or the SR, the CSI, and the ACK/NACK may be sequentially arranged.

In the case of transmitting the UCI by using the second resource, the ACK/NACK, the SR, and the CSI may be sequentially arranged.

The ACK/NACK may be the ACK/NACK combination 1, and when the ACK/NACK is arranged next the CSI, the ACK/NACK may be arranged in the LSB of maximum information bits which are supportable in the PUCCH format. For example, when the maximum information bits which are supportable in the PUCCH format are 22 bits, the ACK/NACKs are arranged in a 21-th bit and a 22-th bit which are the last 2 bits. Even in the case where the CSI bit number is variably changed, the bit position of the ACK/NACK is not changed, and as a result, the error may be reduced. However, in the case where a possible ACK/NACK bit number does not exceed 11 according to whether a target (a cell or a process of an independent CSI constituted for the cell) of the configuration of the CSI is one or two or without the CSI bit number and the ARI, the ACK/NACK may be arranged in the LSB of the maximum information bit which is supportable by applying the single RM in the format. For example, a 2-bit ACK/NACK is arranged in the last bits (10 and 11-th bits) of 11 bits.

In the case where the SR is arranged next to the CSI, the SR may be arranged in the LSB of the maximum information bit which is supportable in the PUCCH format or arranged next to the CSI. In the case where the SR is arranged in the LSB, when the SR is transmitted together with the ACK/NACK, the ACK/NACK is arranged in the LSB, and the SR is arranged before the ACK/NACK. For example, in the case where the maximum information bits which are supportable in the PUCCH format are 22 bits, when the ACK/NACKs are arranged in the last 2 bits (the 21-th bit and the 22-th bit), the SR is arranged in the 20-th bit.

When generally extended, in the case of being configured to use a PUCCH format X (alternatively, the PUSCH) for a case where only the multiple CSI transmission is present or configured to use a PUCCH format Y (alternatively, the PUCCH format 3) as the 'second resource' for transmitting the 'second ACK/NACK target combination' in the CSI transmission subframe, the 'first resource' for transmitting the 'first ACK/NACK target combination' becomes the PUCCH format X (alternatively, the PUSCH). Here, when X is the same as Y (that is, in the case of the same series of formats, and the same series of formats mean occupying physically the same time, the same frequency, and the same code resource), an index resource which exclusively divides the PUCCH format X and the PUCCH format Y may be used.

Figure 23:
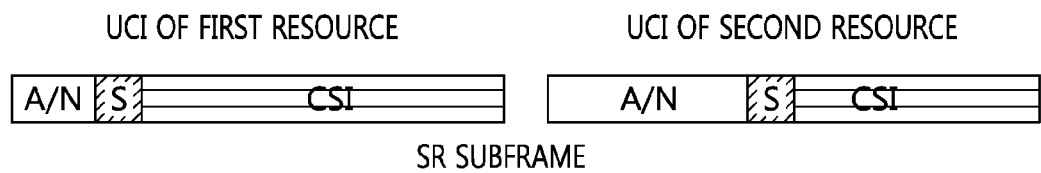
FIG. 23 is another example illustrating an arrangement order of the ACK/NACK, the CSI, and the SR.

FIG. 23 is another example illustrating an arrangement order of the ACK/NACK, the CSI, and the SR.

Referring to FIG. 23, on the assumption of a case of using the PUCCH format 3, in a bit field of the UCI transmitted by using the first source, the ACK/NACK is first allocated based on the MSB, and the CSI is allocated after the SR bits is allocated. In addition, the bit field of the UCI transmitted by using the second resource is also arranged in the order of the ACK/NACK, the SR, and the CSI, like the first resource. The bit field for the SR bits may be ensured even though any one of the first resource and the second resource is used. The same method as FIG. 19 is used, but in the SR subframe in which the SR is transmitted, the method described with reference to FIG. 23 may be used.

IV. Coding Method and Selection Reference of PUCCH Resource

In the case of using a specific PUCCH format (for example, in the case of using the PUCCH format 3), the single RM may be used when the bit number of the UCI is 11 bits or less, and the dual RM may be used when the bit number of the UCI is larger than 11 bits. Of course, this is just an example.

Further, the PUCCH format 2 may transmit 11 bits (information bits), the PUCCH format 3 may transmit 21 bits (alternatively, information bits of 22 bits), and the PUSCH may transmit the bit number of 21 bits or more. The selection of the coding method and the determination of the PUCCH format may be selected on the basis of the number of specific payloads (that is, a length of information bits of the UCI). In this case, a method of determining the number of payloads will be described. This may be limited based on the selection of the coding method in a situation where the ACK/NACK and the CSI are joint-coded.

1. Method of Determining the Number of Payloads on the Basis of a Total of Bit Numbers of the UCI Combination which is Actually Transmitted by the User Equipment In the case of transmitting the ACK/NACK, the number of payloads is based on an ACK/NACK bit number, and in the case of transmitting the CSI, the number of payloads is based on a total of CSI bit numbers. In the case of simultaneously transmitting the ACK/NACK and the CSI, the number of payloads is based on a total of the ACK/NACK bit number and the CSI bit number.

In the case of simultaneously transmitting the ACK/NACK and the SR, the number of payloads is based on a total of the ACK/NACK bit number and the SR bit number. In the case of simultaneously transmitting the SR and the CSI, the number of payloads is based on a total of the SR bit number and the CSI bit number. In the case of simultaneously transmitting the ACK/NACK, the SR, and the CSI, the number of payloads is based on a total of the ACK/NACK bit number, the SR bit number, and the CSI bit number.

2. Method of Determining the Number of Payloads Based on a Total of a Transmittable UCI Combination with Ambiguity and a UCI Combination without Ambiguity Even in the case where the user equipment needs to actually transmit the ACK/NACK but misses the transmission, the same coding method is maintained regardless of the error, and as a result, when the base station decodes the UCI, there is no error in a field configuration and additional blind decoding is not caused.

During the ACK/NACK transmission, the number of payloads is based on the ACK/NACK bit number, and during the CSI transmission, the number of payloads is based on a total of the CSI bit number and the transmittable ACK/NACK bit number. Preferably, the NACK is transmitted at a bit site for the ACK/NACK.

In the case of simultaneously transmitting the ACK/NACK and the CSI, the number of payloads is based on a total of the ACK/NACK bit number and the CSI bit number, and in the case of simultaneously transmitting the ACK/NACK and the SR, the number of payloads is based on a total of the ACK/NACK bit number and the SR bit number. In the case of simultaneously transmitting the SR and the CSI, the number of payloads is based on a total of the SR bit number and the CSI bit number. Preferably, the NACK is transmitted at a bit site for the ACK/NACK.

In the case of simultaneously transmitting the ACK/NACK, the SR, and the CSI, the number of payloads is based on a total of the ACK/NACK bit number, the SR bit number, and the CSI bit number.

In the methods 1 and 2, the CSI bit number may be replaced with {pre-designated fixed value: e.g., 11 bits}, {RRC set value}, {possible maximum CSI bit number}, {specific value between possible maximum and minimum CSI bit numbers}, {max (threshold value, bit number before channel-coding of the UCI)}, {weighted value for each UCI type}, or {assignment of a value according to the range of a bit number of CSI actually generated}.

For example, in the case where a plurality of DL cells is configured in one user equipment and only the CSI for one DL cell is transmitted and the CSIs for the remaining DL cells are dropped when the CSIs for one or more DL cells having corresponding transmission periods collide with each other in the subframe n configured so that the CSIs are transmitted in the CSI reporting mode configured in each DL cell, the • possible maximum CSI bit number} may be one of the following 1) to 7).

1) Bit number of CSI selected according to a priority rule among the CSIs colliding with each other in the subframe n, 2) Maximum CSI bit number of CSI for a secondary cell having a higher priority than CSI for primary cell and CSI of the primary cell, among CSIs colliding with each other in the subframe n, 3) Maximum CSI bit number among CSIs colliding with each other in the subframe n (that is, maximum value in frequency axis), 4) Maximum value of CSI bit number for DL cell to be transmitted to one subframe in CSI reporting modes configured in a plurality of DL cells configured to user equipment (that is, maximum value in time-frequency axis), In the case where the plurality of DL cells is configured in one user equipment, and the CSI reporting mode configured in each DL cell is configured so that the CSIs for the corresponding DL cell are multiplexed and transmitted when the CSIs for one or more DL cells having corresponding transmission periods collide with each other, 5) Sum of bit numbers of CSIs to be transmitted among CSIs colliding with each other in subframe n, 6) Sum of CSI bit numbers of CSIs colliding with each other in subframe n, 7) Maximum value of CSI bit number for DL cell to be transmitted to one subframe in CSI reporting modes configured in a plurality of DL cells configured to user equipment (that is, maximum value in time-frequency axis).

The 4) has an advantage of being implemented without a change of the field size on the corresponding configuration, and the 3) may have a change of the field size for each subframe, but have an advantage of simply determining the field size.

The case of 2) is an optimal method for controlling the error when misrecognition between the base station and the user equipment occurs with respect to activation/deactivation of the cell. That is, when the CSI of the primary cell is not present, the 3) operates, and when the CSI of the primary cell is present, a maximum size of each of the CSIs of the secondary cell having a high priority than the CSI of the primary cell and the CSI of the primary cell is selected so as to compare only the CSI having selectivity due to the misrecognition. Then, the field size of the CSI of the secondary cell having no selectivity due to the lower priority than the CSI of the primary cell may be prevented from being selected. Since the primary cell is activated at all times, when the CSI of the primary cell is present, a comparison in the priority with the CSI of the primary cell is required.

When the CSI field is configured according to the CSI bit number determined as described above, the bits of the CSI to be selected to be transmitted is mapped from the MSB of the corresponding field, and when the bit field remains, the remaining bit field may be filled with '0'.

In the method, all the configured DL cells are targeted regardless of activation or deactivation, but the target may be limited to the activated DL cells. In the case where semistatically fixed CSI bit numbers are configured and used according to the cell configuration of the user equipment, the reference may be determined regardless of the change of the CSI bit number to be transmitted, and as a result, it is advantageous that an error (different coding methods between the user equipment and the base station, PUCCH format recognition, and the like, according to the change of the CSI field length) in the misrecognition situation for the CSI activation/deactivation may be prevented.

3. Method of Determining the Number of Payloads Based on a Total of a Transmittable UCI Combination with Ambiguity and a UCI Combination without Ambiguity The method is a method based on all the combinations, that is, a total of the transmittable ACK/NACK bit number, the SR bit number (even though the SR subframe is not), and the possible maximum CSI bit number. Here, the possible maximum CSI bit number becomes a maximum bit number for all the DL cells transmittable in one subframe configured in each transmission mode during the CSI transmission for the plurality of DL cells or a maximum bit number of the CSI for one selected DL cell.

The transmittable ACK/NACK bit number (that is, the bit number occupied by the ACK/NACK field) may be determined below as the number of possible ACK/NACKs in the corresponding subframe.

For example, in the FDD, the number of DL cells configured to the user equipment, and the number of maximum transmission blocks which may be scheduled in one downlink subframe according to a downlink transmission mode of each DL cell may be determined. In the TDD, the number of DL subframes corresponding to one UL subframe needs to be additionally considered.

In this case, all the configured DL cells may be targeted regardless of activation or deactivation, or only the activated DL cell may be targeted. That is, the ACK/NACK for the deactivated DL cell may be excluded. The targeting of only the activated DL cell may be applied to only the case where the ACK/NACK and the CSI for the plurality of DL cells are multiplexed and simultaneously transmitted.

When the ACK/NACK bit field is configured based on the configured DL cell, the CSI bit field may be also configured based on the configured DL cell. When the ACK/NACK bit field is configured based on the configured DL cell, the CSI bit field may be also configured based on the activated DL cell.

Like the ACK/NACK combination 1 and the ACK/NACK combination 2, when the DL channel combination of the targeted ACK/NACK is divided and the ACK/NACK bit number is determined according thereto, the corresponding transmittable ACK/NACK bit number may become each bit number according to the ACK/NACK combination 1 and the ACK/NACK combination 2.

Further, the method is assumed to the case where maximum 22 bits are transmitted with the PUCCH format 3, but may be also applied to the case where different bit numbers are limited unlike the case. For example, the limitation of the bit number may be given according to the channel status situation of the user equipment. The limitation of the bit number may be given as the total bit number or each bit number, and a method in which some CSIs are dropped or compressed according to the condition may be applied.

Therefore, the selection of the coding method, the PUCCH format determination, and the like may be determined by the condition and the dropped or compressed CSI bit number.

V. Transmission of Content Indicator

As described above, ambiguity between the base station and the user equipment for the presence or absence of the ACK/NACK may occur. One method for solving the ambiguity is to reserve (prepare) a specific bit field regardless of the presence or absence of the ACK/NACK. However, such a method has a disadvantage in that effectiveness of the resources deteriorates.

In the present invention, in the case of combining and transmitting the UCIs, an indicator notifying a transmission UCI content combination may be included in a field at a predetermined fixed position.

Figure 24:
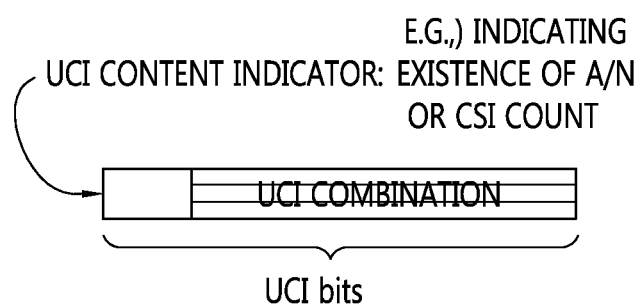
FIG. 24 illustrates an example including a UCI content indicator.

FIG. 24 illustrates an example including a UCI content indicator.

As illustrated in FIG. 24, 1 bit among UCI bits may represent whether a specific UCI type, for example, an ACK/NACK is included. For example, a UCI content indicator may indicate whether or not include the 'ACK/NACK combination 1' in the first resource, Alternatively, the UCI combination may be notified with a plurality of bits. In this case, the UCI content indicator may include the number of CSI transmission target DL CCs, the ACK/NACK bit number, the selection of the CSI or the ACK/NACK, and the like to notify the UCI combination.

The UCI content indicator may be individually coded by separating different UCIs in order to improve decoding performance. In the case of being coupled with different UCIs, additional channel coding may be performed. That is, primary channel coding is first performed in the UCI content indicator, and thereafter, secondary channel coding may be performed together with other UCIs. For example, in the case of a UCI content indicator of 1 bit, repeated coding is performed, and in the case of a UCI content indicator of 2 bits, simplex coding is performed and then joint coding may be performed together with other UCIs.

Further, the UCI content indicator may be transmitted through reference signal modulation so as not to influence an OFDM symbol transmitting a control signal in the PUCCH format 3. In the case of the reference signal modulation, since two reference signals per one slot are required, the reference signal modulation is applied to a normal CP (two reference signal are present in the slot), and a joint-coding method may be considered in an extended CP (one reference signal is present in the slot).

Meanwhile, when the bit field is reserved for the UCI content indicator, the limitation may occur in the CSI bit field, and in order to prevent the limitation, Table 3 in which basis sequences are 13 may be used instead of Table 4 in which the basis sequences are 11 as the RM basis sequences of the PUCCH format 3. This may be applied to the single RM and the dual RM, or only the dual RM using. Further, this may be applied to the PUCCH format 3 resource (for example, the first resource of FIG. 18) used for the UCI content indicator. Alternatively, for the dual RM, a method of newly adding one or two RM basis sequences may be considered.

The UCI combination may be adjusted depending on a usable bit number of the UL control channel according to the ACK/NACK transmission. That is, in the UL subframe transmitting the CSI, the CSI is dropped and only the ACK/NACK is transmitted by using the entire resource, or the compressed ACK/NACK and the CSI for one DL CC are transmitted, or the CSIs for the plurality of DL CCs are transmitted without the ACK/NACK transmission.

Therefore, in the case the UCI content indicator may notify whether only the CSI is transmitted, the CSI and the ACK/NACK combination 1 are transmitted, or the CSI and the ACK/NACK combination 2 are transmitted, in all cases, the PUSCH or the PUCCH format (for example, PUCCH format 3 series) of the same resource (index) may be used. In this case, the resource allocated to the RRC for the case where only the CSI is transmitted may be commonly used.

For example, the UCI content indicator may notify whether {the 'ACK/NACK combination 1' and the CSI are simultaneously transmitted}, {the 'ACK/NACK combination 2' and the CSI are simultaneously transmitted}, • only the 'ACK/NACK combination 2' is transmitted •, or {only the CSI is transmitted}, in the first resource •

As another example, the UCI content indicator may notify whether {the 'ACK/NACK combination 1' and the CSI are simultaneously transmitted}, {the 'ACK/NACK combination 2' and the CSI are simultaneously transmitted}, {only the 'ACK/NACK combination 2' is transmitted}, or {only the CSI is transmitted}, in the CSI transmission subframe.

Meanwhile, the UCI content indicator may be applied in a state where the division of the first resource and the second resource is maintained, and in this case, the contents of the UCI content indicator may be applied differently for each selected resource.

For example, the UCI content indicator may notify information on whether {the ACK/NACK is transmitted based on the configured cell}, and {the ACK/NACK is transmitted based on the activated cell}, {(spatial) bundling is applied}. The UCI content indicator may use 2 bits in the CSI transmission subframe and only 1 bit in the case where the CSI transmission subframe is not.

Figure 25:
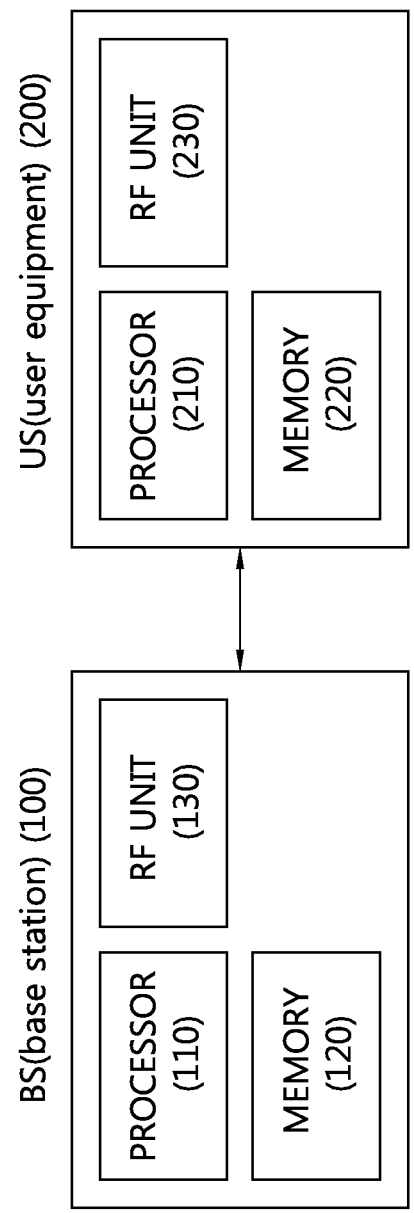
FIG. 25 is a block diagram illustrating a base station and a user equipment in which the embodiment of the present invention is implemented.

FIG. 25 is a block diagram illustrating a base station and a user equipment in which the embodiment of the present invention is implemented.

A base station 100 includes a processor 110, a memory 120, and a radio frequency (RF) unit 130. The processor 110 implements a function, a process, and/or a method which are proposed. Layers of a wireless interface protocol may be implemented by the processor 110. The processor 110 may configure the periodic CSI transmission and the SR transmission through an upper layer signal such as an RRC message. For example, the processor 110 may notify a subframe which may transmit the periodic CSI, the SR, and the like. Further, the processor 110 may be configured so that the user equipment uses the PUCCH format to be used in the ACK/NACK feedback, for example, the PUCCH format 3. The memory 120 is connected with the processor 110 to store various pieces of information for driving the processor 110. The RF unit 130 is connected with the processor 110 to transport and/or receive the radio signal.

A UE 200 includes a processor 210, a memory 220, and an RF unit 230. The processor 210 implements a function, a process, and/or a method which are proposed. Layers of a wireless interface protocol may be implemented by the processor 210. The processor 210 may use the first resource or the second resource according to the ACK/NACK combination to be transmitted in the subframe transmitting the periodic CSI. In the case of using the first source, the ACK/NACK may be the first ACK/NACK combination, and in the case of using the second resource, the ACK/NACK may be the second ACK/NACK combination. Further, in the case of using the first source, the bits for the ACK/NACK are reserved regardless of the actual transmission of the first ACK/NACK combination, and the position of the information bit stream may be next to the periodic CSI. In the case of using the second resource, the second ACK/NACK combination may be positioned before the periodic CSI in the information bit stream. The memory 220 is connected with the processor 210 to store various pieces of information for driving the processor 210. The RF unit 230 is connected with the processor 210 to transport and/or receive the radio signal.

The processors 110 and 210 may include an application-specific integrated circuit (ASIC), another chip set, a logic circuit and/or a data processing apparatus. The memories 120 and 220 may include a read-only memory (ROM), a random access memory (RAM), a flash memory, a memory card, a storage medium, and/or another storage device. The RF units 130 and 230 may include a baseband circuit for processing the radio signal. When the embodiment is implemented by software, the aforementioned technique may be implemented by a module (a process, a function, and the like) that performs the aforementioned function. The module may be stored in the memories 120 and 220, and executed by the processors 110 and 210. The memories 120 and 220 may be provided inside or outside the processors 110 and 210 and connected with the processors 110 and 210 by various well-known means.

What is claimed is:

1. A method for transmitting uplink control information (UCI) in a wireless communication system, the method performed by a user equipment and comprising:
   receiving a physical downlink shared channel (PDSCH);
   configuring a subframe for transmitting periodic channel state information (CSI);
   selecting a first resource or a second resource if a transmission of acknowledgement/not-acknowledgement (ACK/NACK) information for the PDSCH and a transmission of the periodic CSI coincide in the subframe;
   generating a bit sequence comprising the ACK/NACK information and the periodic CSI; and
   transmitting the bit sequence in the subframe using the selected resource,
   wherein the first resource is one fixed resource pre-configured by a higher layer signal and the second resource is one resource indicated by an ACK/NACK resource indicator (ARI) field among a plurality of resources configured by a higher layer signal,
   wherein the location of the ACK/NACK information and the periodic CSI in the bit sequence is dependent on the selected resource used for transmission of the bit sequence,
   wherein when the bit sequence is transmitted using the first resource, the periodic CSI is arranged first, based on the most significant bit (MSB) of the bit sequence, and the ACK/NACK information is arranged next, and
   wherein when the bit sequence is transmitted using the second resource, the ACK/NACK information is arranged first, based on the MSB of the bit sequence, and the periodic CSI is arranged next.

2. The method of claim 1, wherein when the bit sequence is transmitted using the first resource, the bit sequence is channel-coded.

3. The method of claim 2, wherein a scheduling request (SR) bit is included in the bit sequence, the SR bit is arranged before a field reserved for the ACK/NACK information based on the MSB of the bit sequence.

4. The method of claim 1, wherein the ACK/NACK information is multiple ACK/NACKs for a plurality of data units.

5. The method of claim 1, wherein if a scheduling request (SR) bit is included in the bit sequence, the SR bit is arranged before a field including the periodic CSI based on the MSB of the bit sequence.

6. A user equipment, comprising:
   a radio frequency (RF) unit transmitting or receiving a radio signal; and
   a processor connected with the RF unit,
   wherein the processor controls the RF unit to receive a physical downlink shared channel (PDSCH), configures a subframe for transmitting periodic channel state information (CSI), selects a first resource or a second resource if a transmission of acknowledgement/not-acknowledgement (ACK/NACK) information for the PDSCH and a transmission of the periodic CSI coincide in the subframe, generates a bit sequence comprising the ACK/NACK information and the periodic CSI and controls the RF unit to transmit the bit sequence in the subframe using the selected resource,
   wherein the first resource is one fixed resource pre-configured by a higher layer signal and the second resource is one resource indicated by an ACK/NACK resource indicator (ARI) field among a plurality of resources configured by a higher layer signal,
   wherein the location of the ACK/NACK information and the periodic CSI in the bit sequence is dependent on the selected resource used for transmission of the bit sequence,
   wherein when the bit sequence is transmitted using the first resource, the periodic CSI is arranged first, based on the most significant bit (MSB) of the bit sequence, and the ACK/NACK information is arranged next, and
   wherein when the bit sequence is transmitted using the second resource, the ACK/NACK information is arranged first, based on the MSB of the bit sequence, and the periodic CSI is arranged next.

7. The user equipment of claim 6, wherein when the bit sequence is transmitted using the first resource, the bit sequence is channel-coded.

8. The user equipment of claim 6, wherein the ACK/NACK information is multiple ACK/NACKs for a plurality of data units.

9. The user equipment of claim 6, wherein if a scheduling request (SR) bit is included in the bit sequence, the SR bit is arranged before a field including the periodic CSI based on the MSB of the bit sequence.

10. The user equipment of claim 6, wherein if a scheduling request (SR) bit is included in the bit sequence, the SR bit is arranged before a field reserved for the ACK/NACK information based on the MSB of the bit sequence.

* * * * *